US010856226B2

(12) United States Patent
Huang et al.

(10) Patent No.: US 10,856,226 B2
(45) Date of Patent: Dec. 1, 2020

(54) SERVICE SET COMPRESSION

(71) Applicant: Intel Corporation, Santa Clara, CA (US)

(72) Inventors: Po-Kai Huang, San Jose, CA (US); Vinod Kristem, San Jose, CA (US); Shahrnaz Azizi, Cupertino, CA (US); Daniel Bravo, Portland, OR (US); Noam Ginsburg, Portland, OR (US); Thomas J. Kenney, Portland, OR (US); Robert Stacey, Portland, OR (US)

(73) Assignee: Intel Corporation et al., Santa Clara, CA (US)

( * ) Notice: Subject to any disclaimer, the term of this patent is extended or adjusted under 35 U.S.C. 154(b) by 0 days.

(21) Appl. No.: 16/271,168

(22) Filed: Feb. 8, 2019

(65) Prior Publication Data

US 2019/0174413 A1 Jun. 6, 2019

Related U.S. Application Data

(60) Provisional application No. 62/627,868, filed on Feb. 8, 2018, provisional application No. 62/655,961, filed on Apr. 11, 2018.

(51) Int. Cl.
*H04W 52/02* (2009.01)
*H04W 84/12* (2009.01)

(52) U.S. Cl.
CPC ... *H04W 52/0229* (2013.01); *H04W 52/0212* (2013.01); *H04W 84/12* (2013.01)

(58) Field of Classification Search
CPC ......... H04W 52/0212; H04W 52/0229; H04W 84/12
See application file for complete search history.

(56) References Cited

U.S. PATENT DOCUMENTS

| | | | |
|---|---|---|---|
| 2013/0177000 A1* | 7/2013 | Abraham | H04W 28/06 370/338 |
| 2013/0177001 A1* | 7/2013 | Abraham | H04W 28/06 370/338 |
| 2018/0007629 A1* | 1/2018 | Dorrance | H04W 52/0229 |
| 2019/0007904 A1* | 1/2019 | Asterjadhi | H04W 52/0229 |
| 2019/0174413 A1* | 6/2019 | Huang | H04W 48/12 |
| 2019/0223101 A1* | 7/2019 | Li | H04W 52/0206 |

* cited by examiner

*Primary Examiner* — Benjamin H Elliott, IV
(74) *Attorney, Agent, or Firm* — Eversheds Sutherland (US) LLP

(57) ABSTRACT

This disclosure describes systems, methods, and devices related to service set compression. A device may determine a wake-up frame comprising one or more fields, wherein the one or more fields indicate an action to be taken on a receiving device. The device may determine an identifier to be indicated in the wake-up frame. The device may determine a size of the identifier. The device may cause to compress the identifier forming a compressed output, wherein the identifier is compressed by applying a cyclic redundancy code (CRC) computation. The device may identify a portion of the compressed output. The device may cause to send the wake-up frame to a receiving device, wherein the wake-up frame comprises the portion of the compressed output based on the size of the identifier.

20 Claims, 14 Drawing Sheets

SERVICE SET COMPRESSION

CROSS-REFERENCE TO RELATED APPLICATIONS

This application claims the benefit of U.S. Provisional Application No. 62/627,868, filed Feb. 8, 2018 and U.S. Provisional Application No. 62/655,961, filed Apr. 11, 2018, all disclosures of which are incorporated herein by reference as if set forth in full.

TECHNICAL FIELD

This disclosure generally relates to systems and methods for wireless communications and, more particularly, to service set compression.

BACKGROUND

Advances in wireless communications require the use of efficient batteries to allow users to utilize their devices for longer times between recharges or replacement. The exchange of data in wireless communications consumes power and having repeated recharges or installation of dedicated power lines may result in a relatively negative user experience.

DETAILED DESCRIPTION

Figure 1:
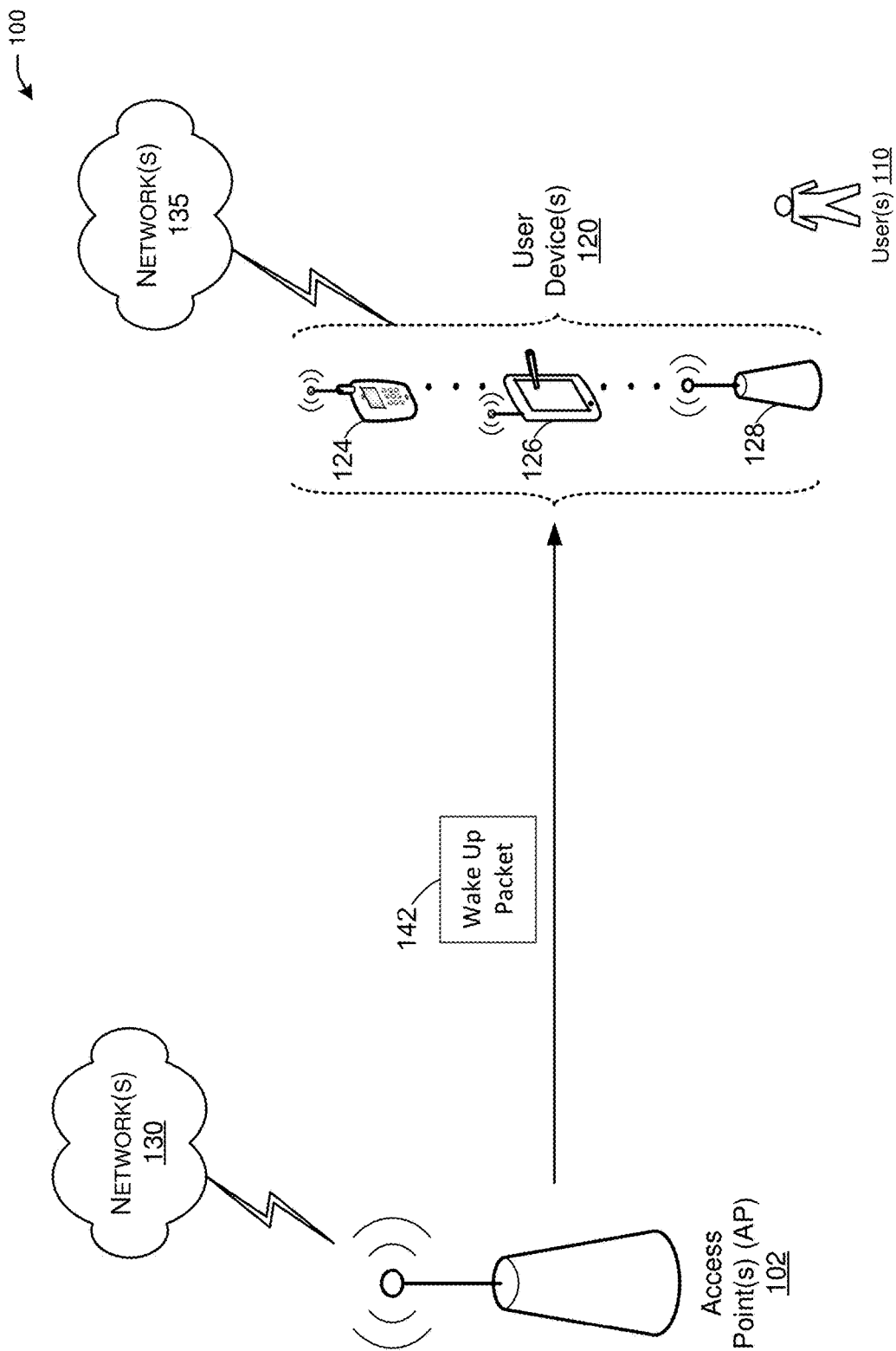
FIG. 1 depicts a network diagram illustrating an example network environment for service set compression, in accordance with one or more example embodiments of the present disclosure.

Example embodiments described herein provide certain systems, methods, and devices for service set compression. The following description and the drawings sufficiently illustrate specific embodiments to enable those skilled in the art to practice them. Other embodiments may incorporate structural, logical, electrical, process, and other changes. Portions and features of some embodiments may be included in, or substituted for, those of other embodiments. Embodiments set forth in the claims encompass all available equivalents of those claims.

Low Power Wake-Up Receiver (LP-WURx) is a technique to enable ultra-low power operation for Wi-Fi device. The idea is for a device to have a minimum radio configuration that can receive wake-up packet from the peer. Hence, the device can stay in low power mode until receiving the wake-up packet from WUR transmitter.

Generally, the transmitter will have a wake-up radio with both transmitting and receiving operation. At the receiver side, only the receiving operation will be implemented, and due to this reason, it is called a wake-up receiver (WURx) at the receiver side.

Note that a wake-up packet is the same as a wake-up frame. Both terms may be used interchangeably. Also, note that the term primary connectivity radio (PCR) is used to refer to the functionality and capability of a device having 802.11 radio to be woken up by the wake up receiver (WUR) based on the receive wake-up frame. To differentiate the wake-up frame from different basic service sets (BSSs), a transmit identification (TXID) is included in the wake-up frame. The size of the TXID is around 12 bits.

IEEE 802.11 has agreed to define a WUR discovery frame so that an AP can send out WUR discovery frame with WUR physical layer (PHY) format with necessary information, and a station device (STA) can scan for the WUR discovery frame using WURx with low power consumption.

To enable discovery for various use cases, the WUR discovery frame will carry the following information, access point identification (APID) information, service set identifier (SSID) information, and channel information. APID information is used by the STA to differentiate different APs. SSID information is used by the STA to search for a specific service network in the case of roaming. Channel information is used by the STA to quickly identify the channel used to search for additional information. There are only two available data rates: 250 kb/s (high data rate) and 62.5 kb/s (low data rate). These two data rates are much smaller than the lowest data rate used, which implies that the whole BSSID (48 bits) is not suitable for APID, the existing variable SSID size (32 bytes) is not suitable for the SSID information field, the whole BSSID (48 bits) is not suitable for TXID of wake-up frame. Hence, a compression method is required to compress the SSID or BSSID into the SSID information field, APID field, and TXID field of WUR discovery frame and wake-up frame. Existing solution for converting BSSID to APID or TXID are using partial BSSID or random choice of ID in the ID space. Existing solution for converting SSID to SSID information field are using partial SSID or hash function. Partial BSSID may lead to collision for a specific vendor due to BSSID assignment. Random choice of ID in the ID space does not provide any connection with the BSSID, which is not the most useful approach for discovery. Partial SSID is also not suitable for providing the SSID information due to usage of similar strings at the front, middle, and end of the SSID information, which may not provide enough uniqueness for similar SSID. A hash function for converting SSID may also introduce extra implementation requirement that is not supported by a radio of the device.

Wake-Up Receiver (WUR) is a companion radio to the main Wi-Fi radio, with a capability of receiving short messages. It enables the main Wi-Fi radio go to sleep, thereby achieving significant power savings without additional latency. As a result, it is very attractive for internet of things (IoT) and Wearable applications and generally in dense deployments. It was introduced to the IEEE 802.11 standards and subsequently a task group was created (TGba). The use cases for 802.11ba have been extended to support a scanning and discovery operation. For handoff purposes, currently the devices must use the main radio to tune off the channel and scan for neighbor channels. With Low Power-WUR, the devices can continue using the main radio for ongoing communication and the WUR can be used for scanning and discovery.

Typically the access point (AP)'s are equipped with multiple transmit antennas, which can be used in several ways to improve the AP-STA link level performance.

An 802.11ba WUR packet comprises of legacy preamble, binary phase shift keying (BPSK) Mark and the WUR portion. The use of cyclic shift diversity (CSD) has been well studied for the legacy preamble during the development of IEEE 802.11 n/ac/ax standards. The use of a CSD for the WUR portion is new and is currently under study in the IEEE 802.11 TGba community.

There is no existing solution that addresses how to set the CSD values for the WUR portion of the WUR packet, under different channel conditions and for different TX waveforms. The CSD values used for the legacy preamble might not be the best for the WUR portion as the legacy preamble occupied 20 MHz bandwidth and the WUR portion occupies only 4 MHz bandwidth and moreover WUR waveform is constructed using ON/OFF Keying (OOK) modulation to enable non-coherent envelope detection at the receiver. So, the available frequency diversity in the channel is different for the legacy preamble and the WUR portion.

Example embodiments of the present disclosure relate to systems, methods, and devices for compression of basic service set identification (BSSID) and service set identifier (SSID).

In one embodiment, a service set compression system may use current cyclic redundancy code (CRC) computation frame check sequence (FCS) field supported by the main radio for compressing BSSID and SSID.

In one embodiment, a service set compression system may use 32-bit CRC as defined for FCS field to compress SSID for compressing SSID.

In one embodiment, for compressing BSSID, a service set compression system may use 32-bit CRC as defined for FCS field or 16-bit CRC to compress BSSID and produce the value for TXID field in wake-up frame or APID field in WUR discovery frame.

In one embodiment, a service set compression system may facilitate that uniqueness for different SSID and BSSID can be provided under compression independent of BSSID assignment or SSID assignment. Standardized way of hashing may be used to minimize implementation requirement.

In one embodiment, a CSD setting for WUR may address the problem of how to use the multiple antennas at the AP for optimally transmitting the WUR packet. A CSD setting for WUR may use cyclic shift diversity (CSD) technique to improve the frequency selectivity of the channel and thereby improve the AP-STA link performance. Additionally, optimized CSD values based on the channel conditions and based on the OOK pulse used for the WUR transmission are provided.

In one embodiment, a CSD setting for WUR may facilitate having the AP assess the fast fading and sense the mobility in the channel and select the CSD value to use accordingly.

In one embodiment, a CSD setting for WUR may facilitate a mechanism for the AP to adjust the CSD value, based on the inverse Fast Fourier Transform (IFFT) coefficients used for generating the on-off keying (OOK) pulse In one embodiment, a CSD setting for WUR may facilitate the ability of the AP to adjust the CSD value based on the number of transmit antennas used for the WUR transmission.

In one embodiment, a CSD setting for WUR may facilitate the ability of the AP to adjust CSD value per user based on its previous knowledge (collected from the main radio) of the link level channel quality.

In one embodiment, a CSD setting for WUR may facilitate having the AP adjust the CSD value to use depending on the WUR data rate. By adjusting the CSD value, based on the channel conditions, the AP-STA link performance can be improved, thereby increasing the coverage area of the AP. If a particular STA is within the coverage of the transmitter AP or another station in a point-to-point connection, by selecting the right CSD value to use, the transmitter can reduce the overall transmit power, while maintaining the quality of the AP-STA link. This can improve the battery life of the transmitter.

The above descriptions are for purposes of illustration and are not meant to be limiting. Numerous other examples, configurations, processes, etc., may exist, some of which are described in greater detail below. Example embodiments will now be described with reference to the accompanying figures.

FIG. 1 is a network diagram illustrating an example network environment of low power wake-up signaling, according to some example embodiments of the present disclosure. Wireless network 100 may include one or more user devices 120 and one or more access points(s) (AP) 102, which may communicate in accordance with IEEE 802.11 communication standards. The user device(s) 120 may be mobile devices that are non-stationary (e.g., not having fixed locations) or may be stationary devices.

Figure 6:
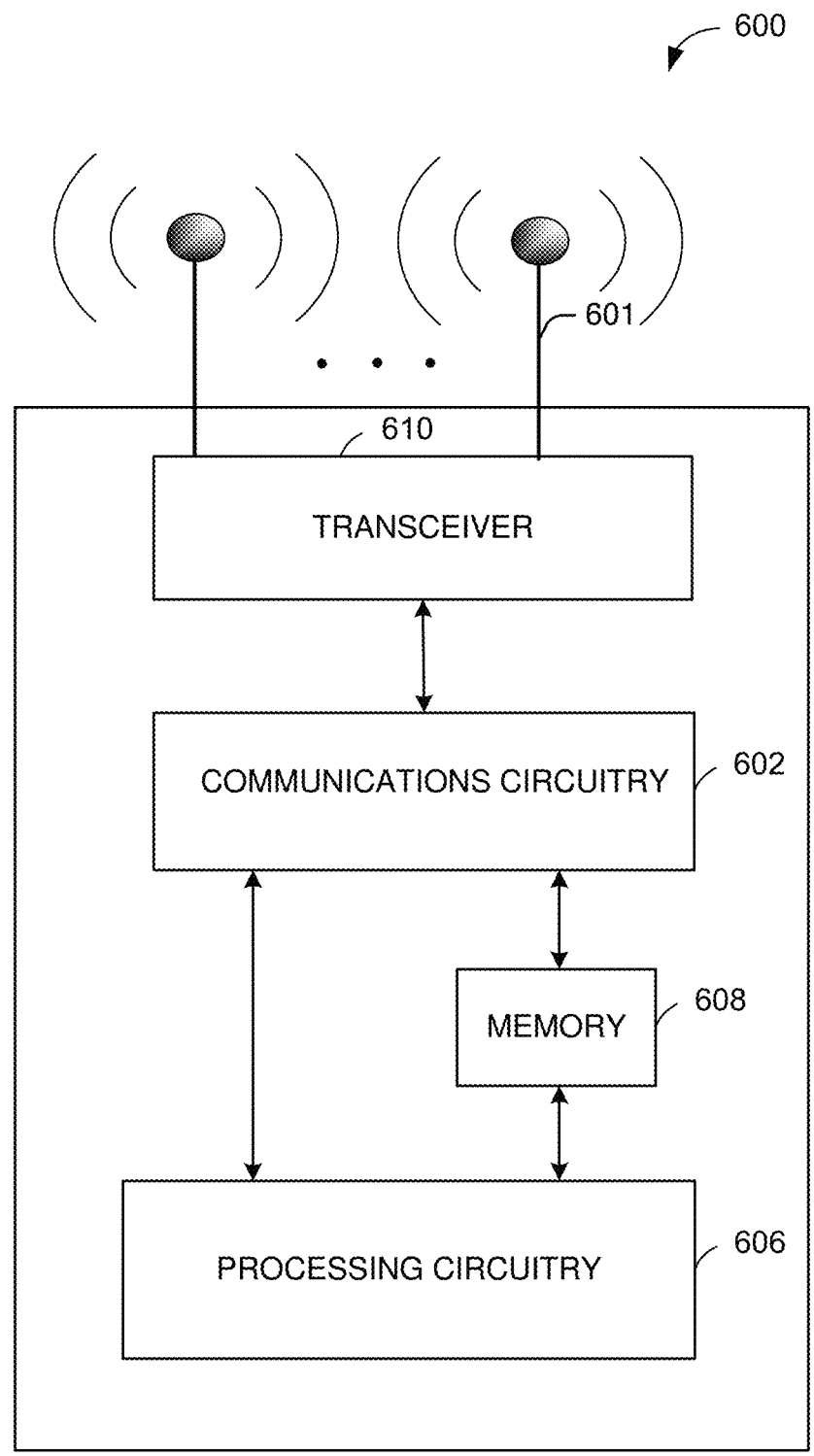
FIG. 6 illustrates a functional diagram of an exemplary communication station that may be suitable for use as a user device, in accordance with one or more example embodiments of the present disclosure.
Figure 7:
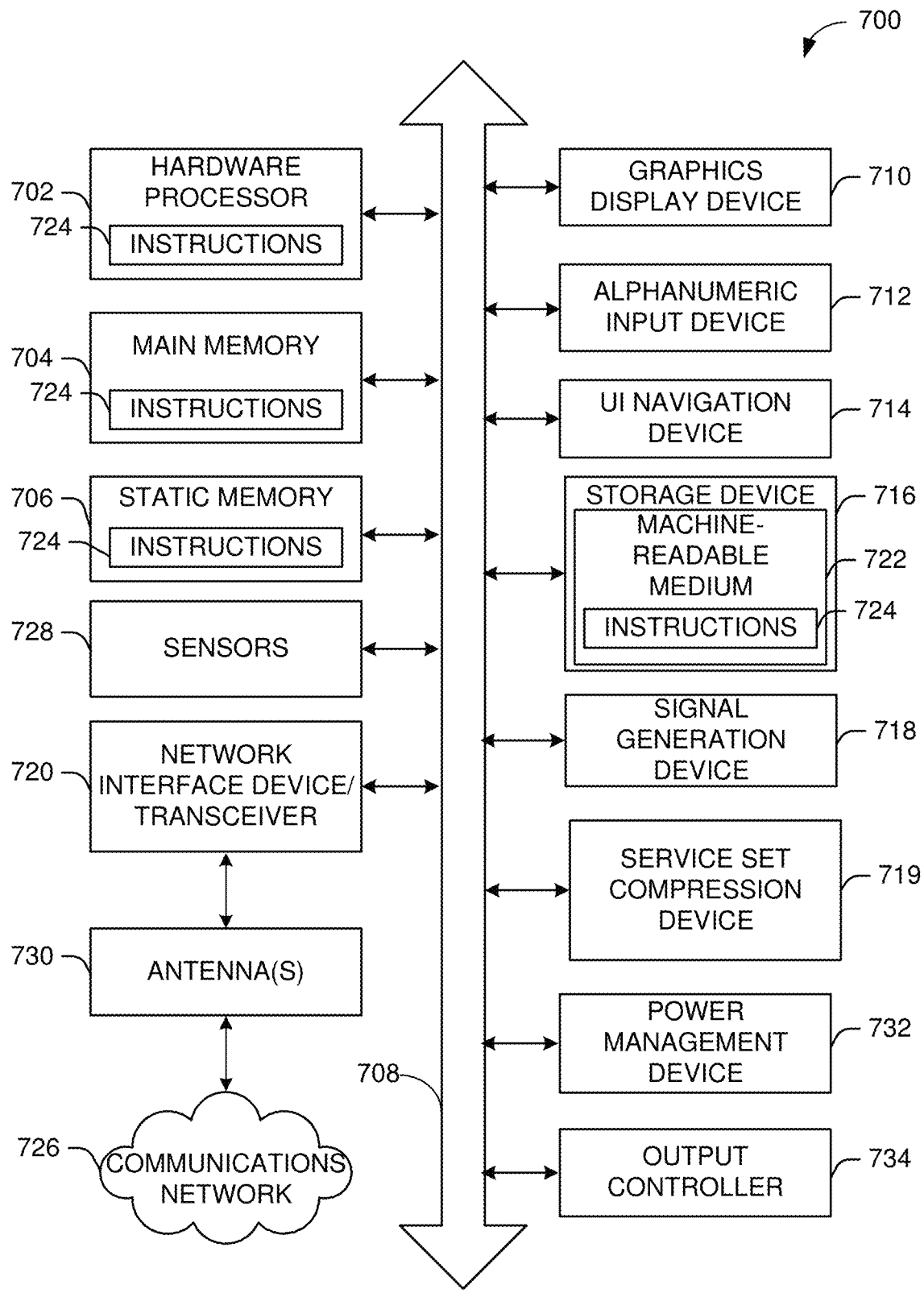
FIG. 7 illustrates a block diagram of an example machine upon which any of one or more techniques (e.g., methods) may be performed, in accordance with one or more example embodiments of the present disclosure.

In some embodiments, the user devices 120 and the AP 102 may include one or more computer systems similar to that of the functional diagram of FIG. 6 and/or the example machine/system of FIG. 7.

One or more illustrative user device(s) 120 and/or AP(s) 102 may be operable by one or more user(s) 110. It should be noted that any addressable unit may be a station (STA). An STA may take on multiple distinct characteristics, each of which shape its function. For example, a single addressable unit might simultaneously be a portable STA, a quality-of-service (QoS) STA, a dependent STA, and a hidden STA. The one or more illustrative user device(s) 120 and the AP(s) 102 may be STAs. The one or more illustrative user device(s) 120 and/or AP(s) 102 may operate as a personal basic service set (PBSS) control point/access point (PCP/AP). The user device(s) 120 (e.g., 124, 126, or 128) and/or AP(s) 102 may include any suitable processor-driven device including, but not limited to, a mobile device or a non-mobile, e.g., a static, device. For example, user device(s) 120 and/or AP(s) 102 may include, a user equipment (UE), a station (STA), an access point (AP), a software enabled AP (SoftAP), a personal computer (PC), a wearable wireless device (e.g., bracelet, watch, glasses, ring, etc.), a desktop computer, a mobile computer, a laptop computer, an ultrabook™ computer, a notebook computer, a tablet computer, a server computer, a handheld computer, a handheld device, an internet of things (IoT) device, a sensor device, a PDA device, a handheld PDA device, an on-board device, an off-board device, a hybrid device (e.g., combining cellular phone functionalities with PDA device functionalities), a consumer device, a vehicular device, a non-vehicular device, a mobile or portable device, a non-mobile or non-portable device, a mobile phone, a cellular telephone, a PCS device, a PDA device which incorporates a wireless communication device, a mobile or portable GPS device, a DVB device, a relatively small computing device, a non-desktop computer, a "carry small live large" (CSLL) device, an ultra mobile device (UMD), an ultra mobile PC (UMPC), a mobile internet device (MID), an "origami" device or computing device, a device that supports dynamically composable computing (DCC), a context-aware device, a video device, an audio device, an A/V device, a set-top-box (STB), a blu-ray disc (BD) player, a BD recorder, a digital video disc (DVD) player, a high definition (HD) DVD player, a DVD recorder, a HD DVD recorder, a personal video recorder (PVR), a broadcast HD receiver, a video source, an audio source, a video sink, an audio sink, a stereo tuner, a broadcast radio receiver, a flat panel display, a personal media player (PMP), a digital video camera (DVC), a digital audio player, a speaker, an audio receiver, an audio amplifier, a gaming device, a data source, a data sink, a digital still camera (DSC), a media player, a smartphone, a television, a music player, or the like. Other devices, including smart devices such as lamps, climate control, car components, household components, appliances, etc. may also be included in this list.

As used herein, the term "Internet of Things (IoT) device" is used to refer to any object (e.g., an appliance, a sensor, etc.) that has an addressable interface (e.g., an Internet protocol (IP) address, a Bluetooth identifier (ID), a near-field communication (NFC) ID, etc.) and can transmit information to one or more other devices over a wired or wireless connection. An IoT device may have a passive communication interface, such as a quick response (QR) code, a radio-frequency identification (RFID) tag, an NFC tag, or the like, or an active communication interface, such as a modem, a transceiver, a transmitter-receiver, or the like. An IoT device can have a particular set of attributes (e.g., a device state or status, such as whether the IoT device is on or off, open or closed, idle or active, available for task execution or busy, and so on, a cooling or heating function, an environmental monitoring or recording function, a light-emitting function, a sound-emitting function, etc.) that can be embedded in and/or controlled/monitored by a central processing unit (CPU), microprocessor, ASIC, or the like, and configured for connection to an IoT network such as a local ad-hoc network or the Internet. For example, IoT devices may include, but are not limited to, refrigerators, toasters, ovens, microwaves, freezers, dishwashers, dishes, hand tools, clothes washers, clothes dryers, furnaces, air conditioners, thermostats, televisions, light fixtures, vacuum cleaners, sprinklers, electricity meters, gas meters, etc., so long as the devices are equipped with an addressable communications interface for communicating with the IoT network. IoT devices may also include cell phones, desktop computers, laptop computers, tablet computers, personal digital assistants (PDAs), etc. Accordingly, the IoT network may be comprised of a combination of "legacy" Internet-accessible devices (e.g., laptop or desktop computers, cell phones, etc.) in addition to devices that do not typically have Internet-connectivity (e.g., dishwashers, etc.).

The user device(s) 120 and/or AP(s) 102 may also include mesh stations in, for example, a mesh network, in accordance with one or more IEEE 802.11 standards and/or 3GPP standards.

Any of the user device(s) 120 (e.g., user devices 124, 126, 128), and AP(s) 102 may be configured to communicate with each other via one or more communications networks 130 and/or 135 wirelessly or wired. The user device(s) 120 may also communicate peer-to-peer or directly with each other with or without the AP(s) 102. Any of the communications networks 130 and/or 135 may include, but not limited to, any one of a combination of different types of suitable communications networks such as, for example, broadcasting networks, cable networks, public networks (e.g., the Internet), private networks, wireless networks, cellular networks, or any other suitable private and/or public networks. Further, any of the communications networks 130 and/or 135 may have any suitable communication range associated therewith and may include, for example, global networks (e.g., the Internet), metropolitan area networks (MANs), wide area networks (WANs), local area networks (LANs), or personal area networks (PANs). In addition, any of the communications networks 130 and/or 135 may include any type of medium over which network traffic may be carried including, but not limited to, coaxial cable, twisted-pair wire, optical fiber, a hybrid fiber coaxial (HFC) medium, microwave terrestrial transceivers, radio frequency communication mediums, white space communication mediums, ultra-high frequency communication mediums, satellite communication mediums, or any combination thereof.

Any of the user device(s) 120 (e.g., user devices 124, 126, 128) and AP(s) 102 may include one or more communications antennas. The one or more communications antennas may be any suitable type of antennas corresponding to the communications protocols used by the user device(s) 120 (e.g., user devices 124, 126 and 128), and AP(s) 102. Some non-limiting examples of suitable communications antennas include Wi-Fi antennas, Institute of Electrical and Electronics Engineers (IEEE) 802.11 family of standards compatible antennas, directional antennas, non-directional antennas, dipole antennas, folded dipole antennas, patch antennas, multiple-input multiple-output (MIMO) antennas, omnidirectional antennas, quasi-omnidirectional antennas, or the like. The one or more communications antennas may be communicatively coupled to a radio component to transmit and/or receive signals, such as communications signals to and/or from the user devices 120 and/or AP(s) 102.

Any of the user device(s) 120 (e.g., user devices 124, 126, 128), and AP(s) 102 may be configured to perform directional transmission and/or directional reception in conjunction with wirelessly communicating in a wireless network. Any of the user device(s) 120 (e.g., user devices 124, 126, 128), and AP(s) 102 may be configured to perform such directional transmission and/or reception using a set of multiple antenna arrays (e.g., DMG antenna arrays or the like). Each of the multiple antenna arrays may be used for transmission and/or reception in a particular respective direction or range of directions. Any of the user device(s) 120 (e.g., user devices 124, 126, 128), and AP(s) 102 may be configured to perform any given directional transmission towards one or more defined transmit sectors. Any of the user device(s) 120 (e.g., user devices 124, 126, 128), and AP(s) 102 may be configured to perform any given directional reception from one or more defined receive sectors.

MIMO beamforming in a wireless network may be accomplished using RF beamforming and/or digital beamforming. In some embodiments, in performing a given MIMO transmission, user devices 120 and/or AP(s) 102 may be configured to use all or a subset of its one or more communications antennas to perform MIMO beamforming.

Any of the user devices 120 (e.g., user devices 124, 126, 128), and AP(s) 102 may include any suitable radio and/or transceiver for transmitting and/or receiving radio frequency (RF) signals in the bandwidth and/or channels corresponding to the communications protocols utilized by any of the user device(s) 120 and AP(s) 102 to communicate with each other. The radio components may include hardware and/or software to modulate and/or demodulate communications signals according to pre-established transmission protocols. The radio components may further have hardware and/or software instructions to communicate via one or more Wi-Fi and/or Wi-Fi direct protocols, as standardized by the Institute of Electrical and Electronics Engineers (IEEE) 802.11 standards. In certain example embodiments, the radio component, in cooperation with the communications antennas, may be configured to communicate via 2.4 GHz channels (e.g., 802.11b, 802.11g, 802.11n, 802.11ax), 5 GHz channels (e.g., 802.11n, 802.11ac, 802.11ax), or 60 GHZ channels (e.g., 802.11ad). In some embodiments, non-Wi-Fi protocols may be used for communications between devices, such as Bluetooth, dedicated short-range communication (DSRC), Ultra-High Frequency (UHF) (e.g., IEEE 802.11af, IEEE 802.22), white band frequency (e.g., white spaces), or other packetized radio communications. The radio component may include any known receiver and baseband suitable for communicating via the communications protocols. The radio component may further include a low noise amplifier (LNA), additional signal amplifiers, an analog-to-digital (A/D) converter, one or more buffers, and digital baseband.

The one or more user devices 120 may operate in a low power mode to conserve power. During this time, the LP-WUR of a user device 120 may be active while an 802.11 transceiver may be inactive. Because the LP-WUR may operate in a lower power state than the 802.11 transceiver, power may be conserved on the user device 120.

In one embodiment, an AP 102 may send one or more wake-up packets 142 to one or more user device(s) 120. A wake-up packet 142 may signal to a user device 120 to activate a higher power mode, which may include activating a higher-powered 802.11 transceiver on the user device 120.

In one or more embodiments, a transmitting device (e.g., an AP) transmits a WUR frame to a receiving device (e.g., in STA), the transmitting device needs to identify itself as the transmitter of the WUR frame. In order to do so, the transmitting device may use a transmitter ID to identify itself as the device transmitting the WUR frame. A WUR frame with transmitter ID in the ID field may be a broadcast WUR frame that is addressed to all the WUR non-AP STAs that are associated with the transmitting device.

The ID field of WUR frames contains an identifier (ID) that is selected from the identifier's space, which consists of all integer values between 0 and 4095. A WUR AP ensures that each identifier is either a transmitter, a WUR group ID, a WUR ID, or any other WUR ID.

The compressed BSSID is equal to the 32-bit CRC calculated over the BSSID contained in Beacon frames transmitted by the WUR AP when multiple BSSID mechanism is not used or the BSSID contained in Beacon frames transmitted by another AP with transmitted BSSID of the multiple BSSID set including the WUR AP when multiple BSSID mechanism is used similar to the calculation of an FCS field, shown below.

In one or more embodiments, the 16-bit CRC is the is complement of the remainder generated by the modulo 2 division of the calculation fields by the polynomial $x^{16}+x^{12}+x^5+1$, where the shift-register state is preset to all 1s.

In one or more embodiments, a WUR AP may use one or more LSBs (e.g., 12 LSBs) of a compressed ID (e.g., compressed BSSID, or other compressed ID) as the transmitter ID of WUR frames it transmits. WUR frames may include at least in part a WUR beacon frame, a WUR wake-up frame, a WUR discovery frame, a WUR mode set up frame, a WUR vendor specific frame, a WUR mode tear down frame, or any other types of WUR frames.

A WUR AP may periodically schedule WUR Discovery frames on the WUR AP's WUR discovery channel for transmission to assist WUR non-AP STAs in WUR AP discovery. The WUR Discovery frames may be scheduled for transmission by the WUR AP with a periodicity as indicated in the WUR Discovery Period field in the WUR AP Parameters subfield of the WUR Discovery element in which the Transmitting WUR AP subfield is set to 1. A WUR non-AP STA may scan WUR discovery channels for WUR Discovery frames. A WUR non-AP STA receiving the WUR Discovery element may use the information of the WUR discovery channels to schedule WUR scanning. The WUR non-AP STA may limit the WUR scanning to the WUR discovery channels listed in the WUR Discovery element.

The WUR Discovery frame may be comprised of one or more fields. For example the WUR discovery frame may comprise a frame control field, and ID field, a type dependent control field, a frame body field, and a frame check sequence (FCS) field. The MAC header of the WUR frame. The frame control field determines the type of WUR frame (e.g., a WUR beacon frame, a WUR wake-up frame, a WUR vendor specific frame, a WUR discovery frame, etc.). The ID field comprises an identifier for the WUR frame which may be dependent on the type of WUR frame. The FCS field may contain a 16 bit CRC, where the CRC is calculated over all the fields of the WUR frame.

In one or more embodiments, a WUR discovery frame may comprise a compressed SSID field and an operating channel field. In one embodiment, for the compressed SSID field in WUR discovery frame, a service set compression system may use 32-bit cyclic redundancy code (CRC) to compress SSID and produce value for the compressed SSID field.

The 32-bit CRC is calculated using the following standard generator polynomial of degree 32:

$$G(x)=x^{32}+x^{26}+x^{23}+x^{22}+x^{16}+x^{12}+x^{11}+x^{10}+x^8+x^7+x^5+x^4+x^2+x+1$$

The FCS is the 1s complement of the sum (modulo 2) of the following:

a) The remainder of $x^k$ multiplied by $(x^{31}+x^{30}+x^{29}+ \ldots +x^2+x+1)$ divided (modulo 2) by $G(x)$, where k is the number of bits in the calculation fields, and b) The remainder after multiplication of the contents (treated as a polynomial) of the calculation fields by $x^{32}$ and then division by $G(x)$.

The compressed SSID information in the WUR discovery frame can be 3 bytes or 4 bytes. The input of the CRC computation is the SSID or 0 bits if there is no SSID information. The compressed SSID information in the WUR discovery frame can be 32 bits or 24 bits. If the compressed SSID information is less than 32 bits, for example x bits, the x least significant bit (LSB) of the 32-bit CRC calculation output are extracted to be used as the compressed SSID info.

In one embodiment, for a transmitter ID (e.g., APID) may be included in the WUR discovery frame. In the WUR discovery frame, a service set compression system may use 32-bit CRC as defined in FCS field for regular 802.11 frame or 16-bit CRC with similar procedure defined in FCS field to compress BSSID and produce value for the APID field. The APID in the WUR discovery frame can be 2 bytes or 3 bytes. The input of the CRC computation is the BSSID. The size of CRC calculation may be larger than the size of the APID field. If the size of APID field, say x bits, is less than the size of the CRC calculation, say y bits, the x LSB of the y-bit CRC calculation output are extracted to be used as the APID.

In one embodiment, for TXID in a wake-up frame, a service set compression system may use 16-bit CRC or 32-bit CRC. The computation procedure can be similar procedure defined in FCS field for regular 802.11 frame or WUR frame to compress BSSID and produce value for the TXID field. The computation procedure can be the same procedure used to calculation the CRC of the FCS field of the wake-up frame. Note that currently the size of TXID is 12 bits. The input of CRC computation is the BSSID. The 12 LSB of the y-bit CRC calculation output are extracted to be used as the TXID value.

It is understood that the above descriptions are for purposes of illustration and are not meant to be limiting.

Figure 2:
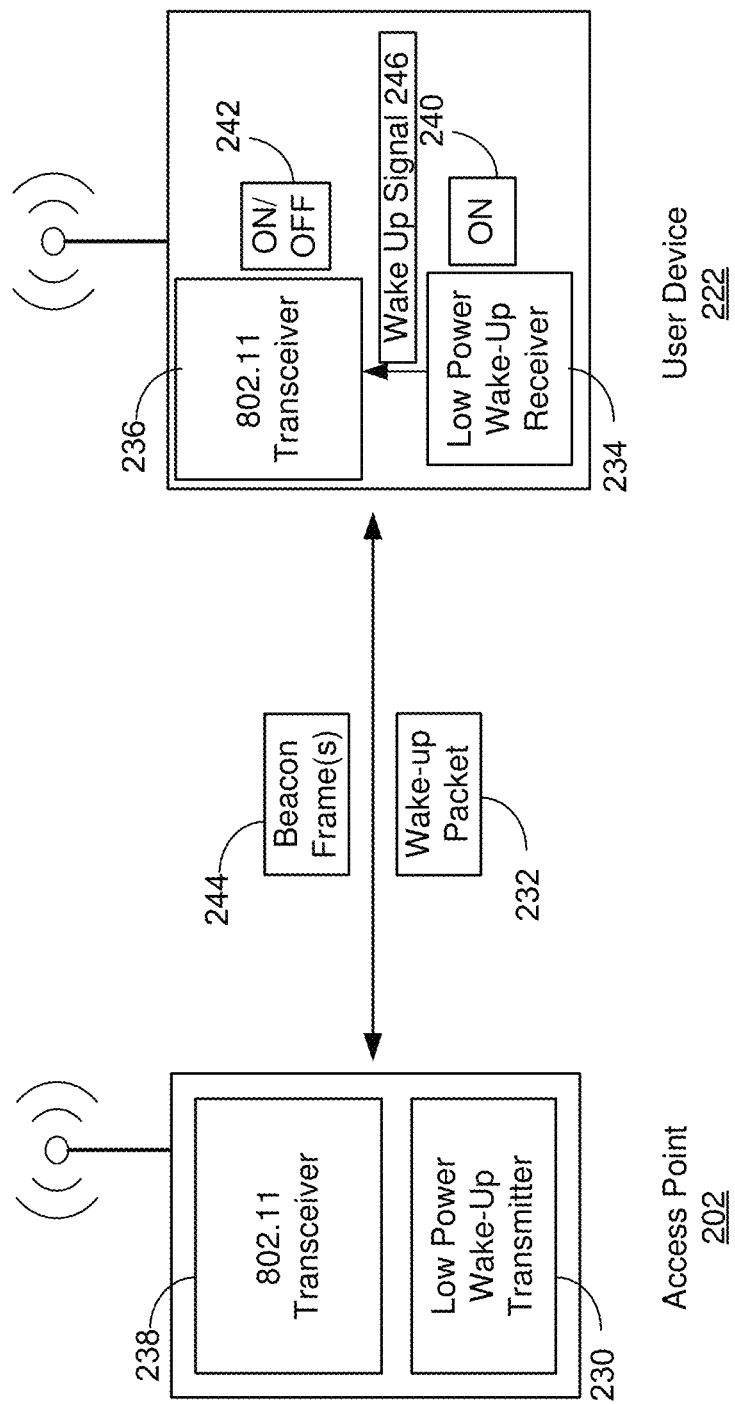
FIG. 2 depicts an illustrative schematic diagram of a low power wake-up receiver (LP-WUR) for a low power wake-up signaling procedure, in accordance with one or more example embodiments of the present disclosure.

FIG. 2 depicts an illustrative schematic diagram of an LP-WUR 234 for a low power wake-up signaling procedure, in accordance with one or more example embodiments of the present disclosure.

Referring to FIG. 2, there is shown a transmitting device (e.g., AP 202) and a receiving device (e.g., user device 222) involved in a transmission session utilizing low-power wake-up signaling. The AP 202 may utilize a low-power wake-up transmitter 230 to send a wake-up packet 232 to the low-power wake-up receiver (LP-WUR) 234 included in the user device 222.

The LP-WUR 234 may use simple modulation schemes such as on-off keying (OOK), amplitude shift keying (ASK), or frequency shift keying (FSK) for signaling. The LP-WUR 234 may use hardware and/or software components that may allow it to operate at a lower power consumption mode than a typical radio component (e.g., 802.11 transceivers 236 and 238).

The LP-WUR 234 may be constantly active (e.g., ON state 240) on the user device 222 in order to receive a wake-up communication (e.g., the wake-up packet 232). The AP 202 may begin transmitting the wake-up packet 232 using a low-power communication method. The LP-WUR 234 may detect and/or decode the wake-up packet and may determine whether the wake-up packet is destined for the user device 222. If the LP-WUR 234 (or other portions of the user device 222) determines that the receiver address (RA) field of the MAC header from the wake-up packet 232 matches the address of the user device 222, the LP-WUR 234 may then send a wake-up signal 246 to the 802.11 transceiver 236 to power on (e.g., ON/OFF state 242) its circuitry.

The wake-up packet 232 may include timing information such as a wake-up period. The wake-up period may be a period of time that the user device 222 may need to have when devices, such as the AP 202, may be sending data to the user device 222. Following the wake-up period, the user device 222 may power off some or all of its circuitry to reduce power consumption and preserve the life of its battery.

The low-power wake-up transmitter 230 may be a device on the AP 202 that transmits a wake-up packet to other devices (e.g., the user device 222). The low-power wake-up transmitter 230 may transmit at the same simple modulation schemes of the user device 222 (e.g., OOK, ASK, FSK, etc.). The low-power wake-up transmitter 230 may utilize signaling in order to generate and transmit the wake-up packet 232.

Figure 3A:
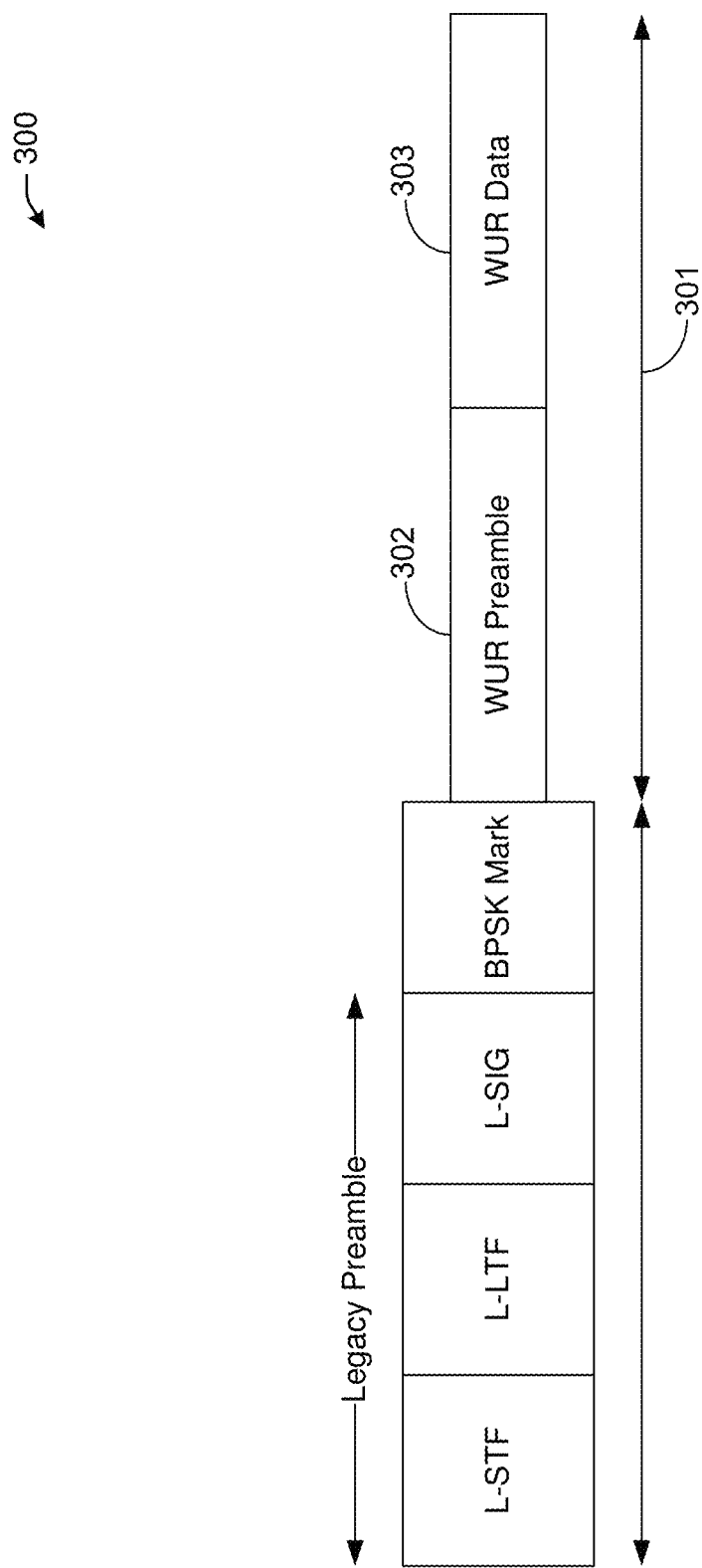
FIG. 3A depicts an illustrative schematic diagram for a WUR packet structure, in accordance with one or more example embodiments of the present disclosure.

FIG. 3A depicts an illustrative schematic diagram for a WUR packet structure, in accordance with one or more example embodiments of the present disclosure.

Referring to FIG. 3A, there is shown a WUR packet 300. The WUR packet 300 comprises of legacy preamble, binary phase shift keying (BPSK) mark and the WUR portion 301 as shown in FIG. 3A. The WUR portion 301 is further divided into the WUR preamble 302 and WUR data 303. For the low data rate WUR transmission, the preamble is constructed by using a repeated 32 bit sequence S ([S S]), with a bit duration of 2 microsecond (μs). For the data portion, Manchester encoding was used with 4 μs Manchester bit duration for low data rate transmission and 2 μs Manchester bit duration for high data rate WUR transmission. The 2 μs and 4 μs OOK pulses, used for the preamble and data portion, are generated using an OFDM based transmission.

When the AP has multiple transmit (TX) antennas, the transmit signal needs to be generated for each of the antennas. The legacy wireless local area network (WLAN) devices use CSD for transmission with multiple antennas. For this, a known cyclic shift is applied to the waveform in the L-STF, L-LTF and L-SIG fields to generate the transmit waveforms for the other antennas. For these legacy fields, the same CSD value is used across all legacy preamble symbols. If the AP has two TX antennas, a cyclic shift of 200 ns is defined to generate the transmit waveform for $2^{nd}$ antenna. For AP with 4 TX antennas, cyclic shift of 50 ns, 100 ns and 150 ns is defined to generate the transmit waveforms for $2^{nd}$, $3^{rd}$ and $4^{th}$ TX antennas.

For the WUR transmission, to be compatible with legacy devices, the same CSD values need to be applied to the legacy preamble portion and the BPSK Mark of the WUR packet. This is needed to maintain the same range for other STAs and to enable other STAs to detect the L-SIG with the same probability as other transmissions from the AP.

Figure 3B:
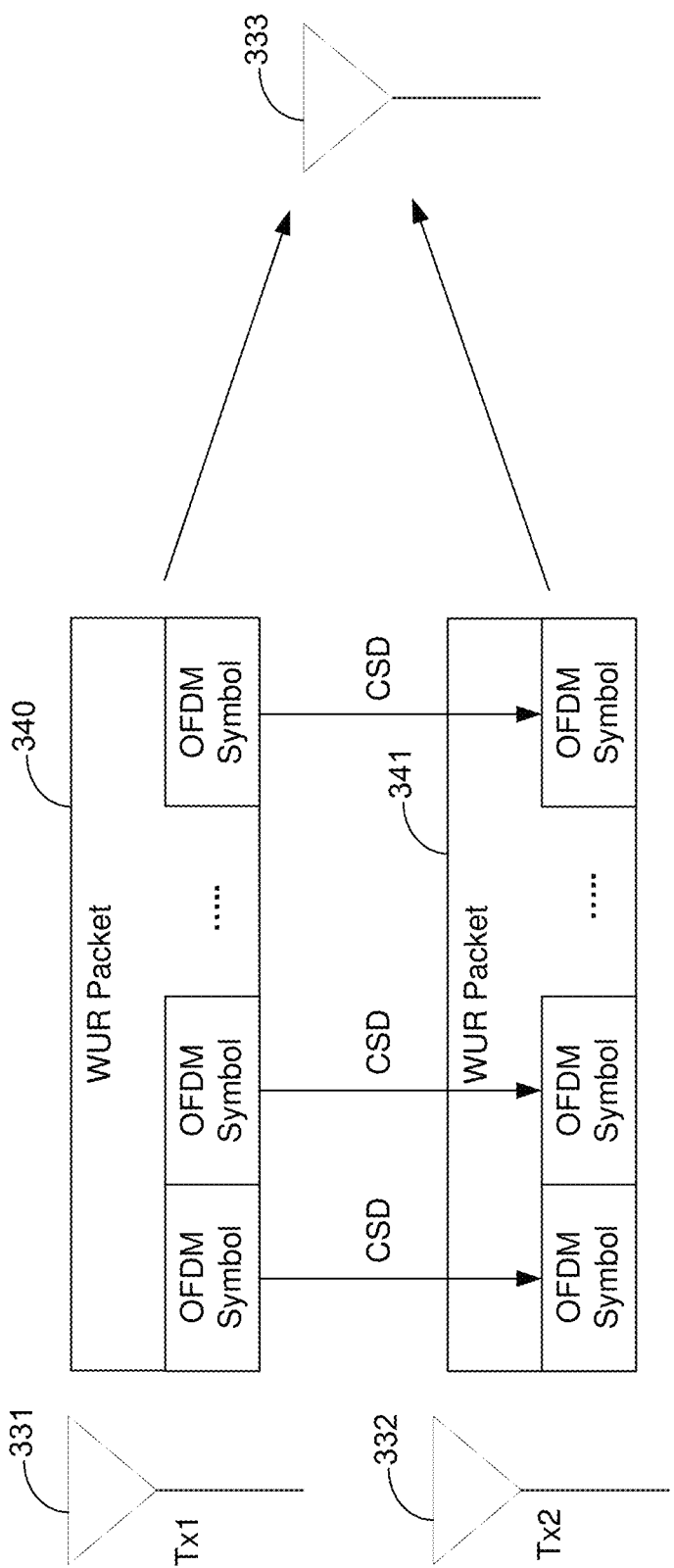
FIG. 3B depicts an illustrative schematic diagram for CSD setting for WUR, in accordance with one or more example embodiments of the present disclosure.

FIG. 3B depicts an illustrative schematic diagram for setting CSD values for WUR, in accordance with one or more example embodiments of the present disclosure.

Referring to FIG. 3B, there is shown WUR transmission from multiple TX antennas (e.g., antenna 331 and antenna 332).

In one or more embodiments, the CSD values may be applied to the WUR portion of the packet (WUR preamble and WUR data). As outlined in FIG. 3B, the values chosen will be different than that used for the legacy portion of the packet. For the $2^{nd}$ TX antenna, the 2 μs and 4 μs OOK pulses to be used for generating preamble and data portion are generated by applying a cyclic shift to the pulses transmitted from the first antenna, as indicated in FIG. 3B.

For example, WUR packet 340 may be comprised of one or more OFDM symbols. The WUR packet 340 may be sent to the antenna 333 on the receiver side with CSD value of 0 ns. In order to transmit the WUR packet 341 using antenna 332, the transmitting device may apply a CSD value to each of the OFDM symbols of the WUR packet 340, which results in a WUR packet 341 that includes the CSD application.

Figure 4A:
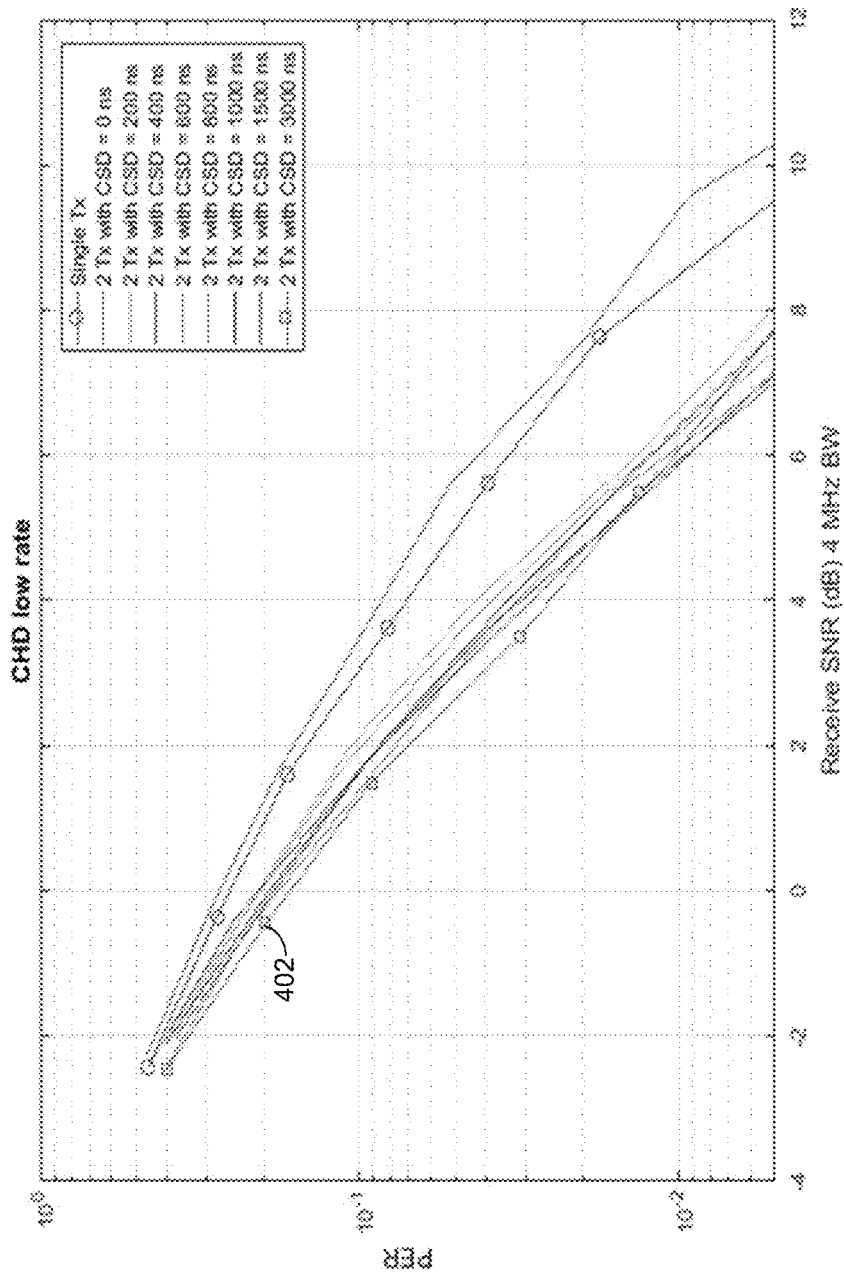
FIGS. 4A-4C depict illustrative schematic diagrams for setting CSD values to be used for WUR, in accordance with one or more example embodiments of the present disclosure.
Figure 4B:
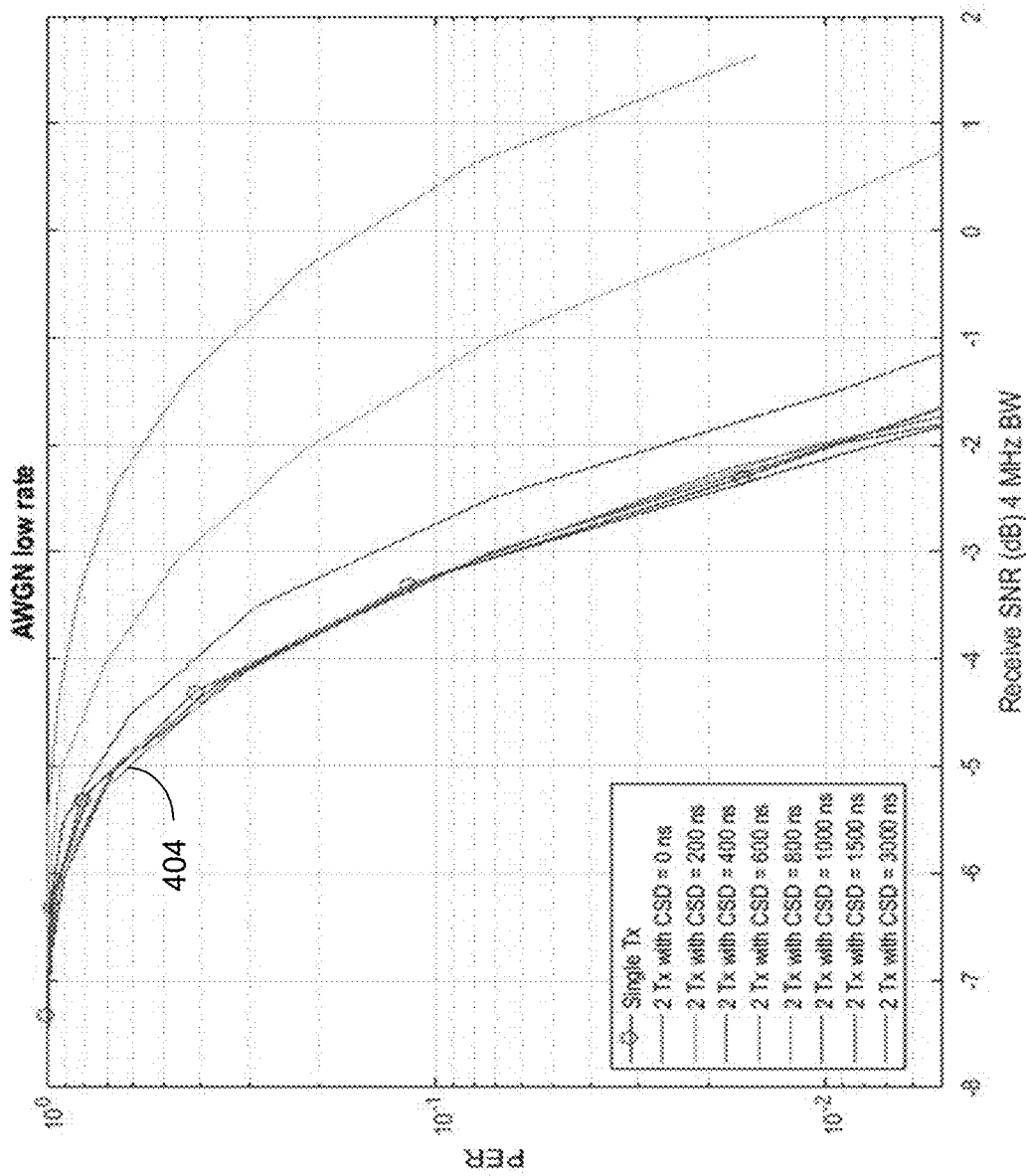
Figure 4C:
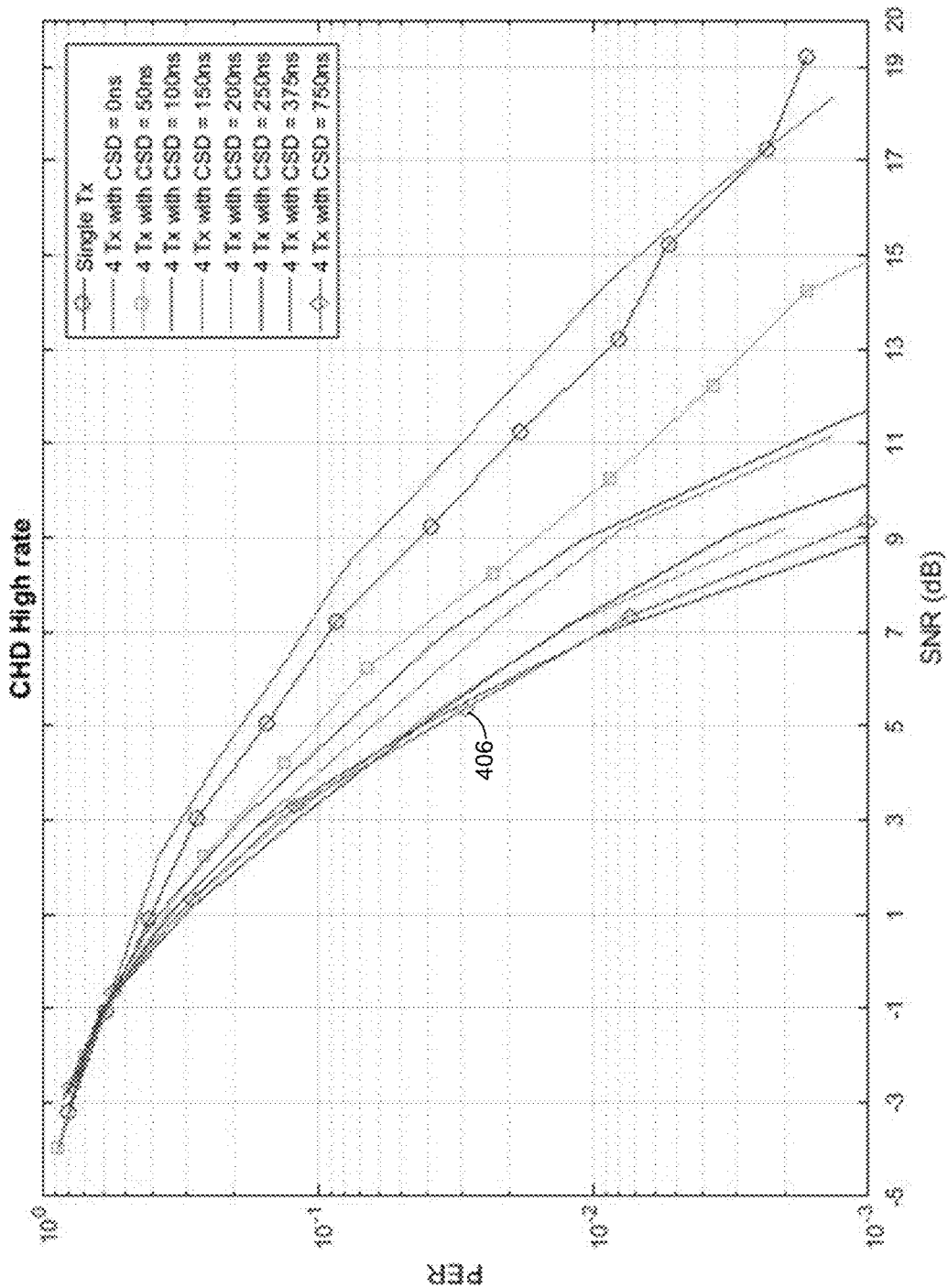

FIGS. 4A-4C depict illustrative schematic diagrams for setting CSD values to be used for WUR, in accordance with one or more example embodiments of the present disclosure.

FIG. 4A shows WUR performance for different CSD in a Channel model D. FIG. 4B shows WUR performance for different CSD in additive white Gaussian noise (AWGN) channel. FIG. 4C shows WUR performance with different CSD for 4 TX antennas. It should be understood that Channel model D (also referred to as Channel D) is a channel that comprises an environment having reflections (e.g., having delay spreads). For example, in a scenario where there exists many metallic objects, objects, walls, etc., causing reflections as opposed to having a strong line of sight channel between the transmitting device and the receiving device.

The WUR performance can be significantly different, for different CSD values, as can be seen from simulation results provided in FIGS. 4A-4C. The figures plot PER for different CSD values in both AWGN and channel model D environments.

In one or more embodiments, since the AP can sense the mobility in the channel, the AP may adjust the CSD value based on the channel conditions. For instance, in an AWGN channel (as seen in FIG. 4B) CSD=0 provides the best performance, where CSD=0 corresponds to plot 404.

In one or more embodiments, for operation in Channel D (e.g., FIG. 4A), a CSD of 3000 ns provides the best performance, where CSD=3000 ns corresponds to plot 402.

In one or more embodiments, the AP may utilize the channel quality information from the main radio of WUR, especially:

(a) For devices that are not mobile such as IoT devices that are equipped with Wi-Fi/WUR, for example a temperature and motion sensors installed on a wall/fixed locations, a sensor that detects water leak, a sensor that measures humidity in attic and etc.

(b) When the AP knows the time laps from the last packet exchange with the main radio STA is not greater than the STA's channel coherence time. This information is often buffered and available at the AP per station for the scheduling purposes of data exchange with the main radio.

In one or more embodiments, the approach is that the AP may also adjust the CSD value based on the OOK waveform that is being transmitted. In IEEE TGba, the exact shape of the waveform is not specified. It was specified that the OOK waveform is generated by populating the center 13 subcarriers with subcarrier spacing of 312.5 KHz. The exact inverse Fast Fourier Transform (IFFT) coefficients to be used are not specified.

In one or more embodiments, the AP can adjust the CSD values based on the IFFT coefficients used for generating the OOK pulse. Different pulse shapes can add up constructively/destructively at the receiver, based on the CSD value used. Thus, by adjusting the CSD value based on the IFFT coefficients used for generating the OOK pulse, the WUR performance can be improved. For example, if there are three possible IFFT coefficients available for the AP when generating the OOK pulse, the AP may choose CSD values for the various antennas on the AP, based on the IFFT coefficients.

In one or more embodiments, the AP may adjust the CSD value based on the WUR transmission rate. For the low rate WUR transmission, one embodiment can use CSD=3000 ns which provides the best performance (e.g., plot 402 of FIG. 4A). For the high rate WUR transmission, it can use CSD=400 ns provides the best performance, as depicted by plot 406 of FIG. 4C. These numbers are recommended without loss of generality as another embodiment may use different coefficient for subcarriers and hence other CSD values maybe more suitable.

In one or more embodiments, the AP adjust the CSD based on the number of transmit antennas used for the WUR transmission. For example, in channel model D, the best performance is obtained for CSD=3000 ns with 2 TX antennas; and for WUR with 4 TX antennas, the best performance was observed when CSD of 750 ns, 1500 ns and 2250 ns was applied for $2^{nd}$, $3^{rd}$ and $4^{th}$ TX antennas. These numbers are recommended without loss of generality as another embodiment may use different coefficient for subcarriers and hence other CSD values maybe more suitable.

In one or more embodiments, the AP may also transmit WUR by utilizing its 4 or more antennas and adjusting CSD values for each of these antenna. Frequency division multiple access (FDMA) transmission can also be used to transmit different WUR frames in different 20 MHz channel. The mechanism proposed above can be applied to WUR frame through FDMA transmission in any 20 MHz channel. AP can choose CSD values that are optimized for all links combined.

It is understood that the above descriptions are for purposes of illustration and are not meant to be limiting.

Figure 5:
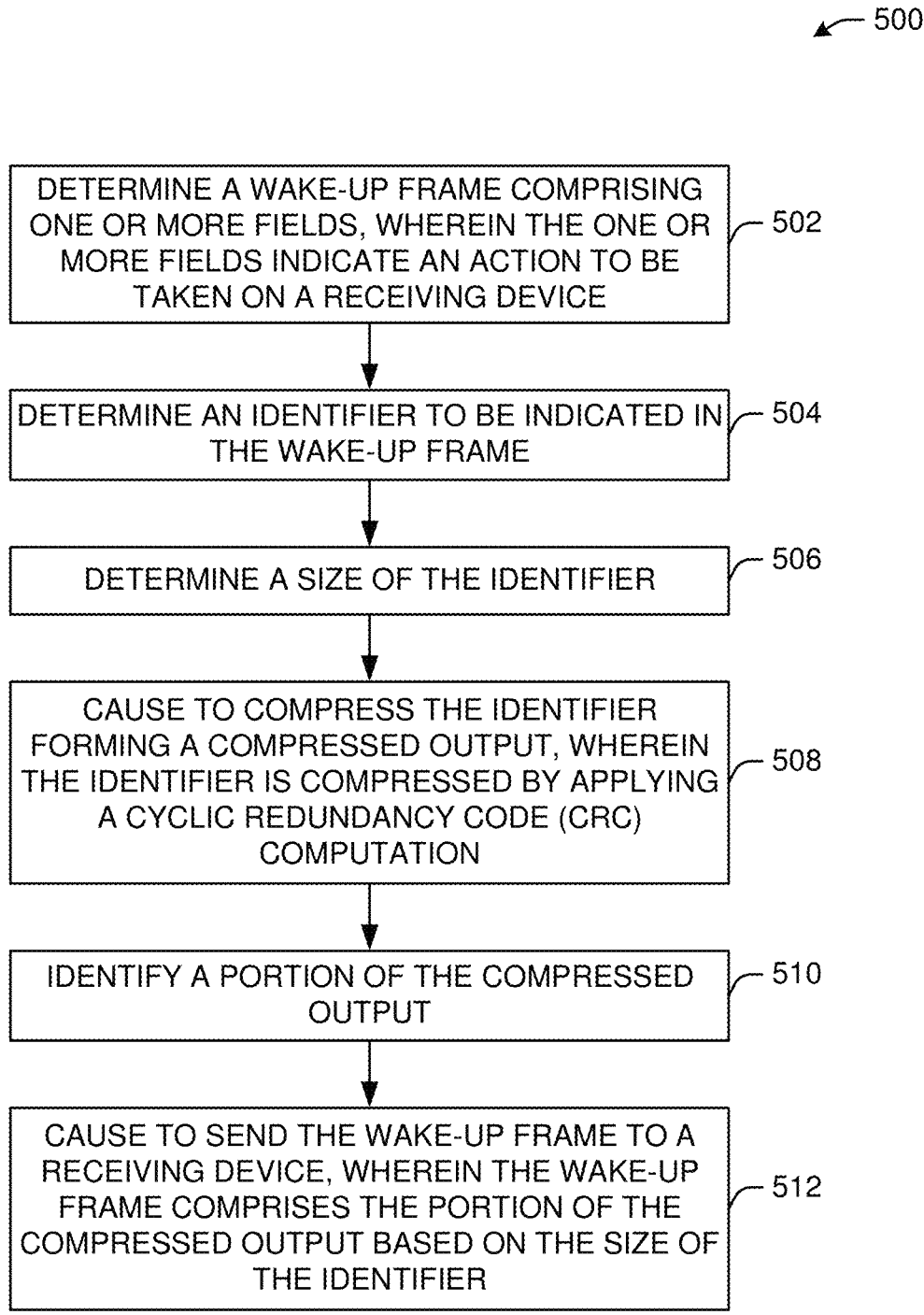
FIG. 5 illustrates a flow diagram of an illustrative process for service set compression, in accordance with one or more example embodiments of the present disclosure.

FIG. 5 illustrates a flow diagram of illustrative process 500 for an illustrative service set compression system, in accordance with one or more example embodiments of the present disclosure.

At block 502, a device (e.g., the user device(s) 120 and/or the AP 102 of FIG. 1) may determine a wake-up frame comprising one or more fields, wherein the one or more fields may indicate an action to be taken on a receiving device. The wake-up frame may be a wake-up receiver (WUR) beacon frame, a WUR wake-up frame, a WUR vendor specific frame, or a WUR discovery frame. The device is an access point (AP).

At block 504, the device may determine an identifier to be indicated in the wake-up frame. The identifier may be a basic service set identification (BSSID), an access point (AP) ID, or a service set identifier (SSID).

At block 506, the device may determine a size of the identifier.

At block 508, the device may cause to compress the identifier forming a compressed output, wherein the identifier is compressed by applying a cyclic redundancy code (CRC) computation and the CRC computation comprises a 32-bit CRC computation.

The device may determine the identifier is a BSSID. The device may determine to use 12 least significant bits (LSBs) of the compressed output. The device may determine the identifier is a SSID. The device may determine to use 12 least significant bits (LSBs) of the compressed output.

At block 510, the device may identify a portion of the compressed output.

At block 512, the device may cause to send the wake-up frame to a receiving device, wherein the wake-up frame comprises the portion of the compressed output based on the size of the identifier.

It is understood that the above descriptions are for purposes of illustration and are not meant to be limiting.

FIG. 6 shows a functional diagram of an exemplary communication station 600 in accordance with some embodiments. In one embodiment, FIG. 6 illustrates a functional block diagram of a communication station that may be suitable for use as an AP 102 (FIG. 1) or a user device 120 (FIG. 1) in accordance with some embodiments. The communication station 600 may also be suitable for use as a handheld device, a mobile device, a cellular telephone, a smartphone, a tablet, a netbook, a wireless terminal, a laptop computer, a wearable computer device, a femtocell, a high data rate (HDR) subscriber station, an access point, an access terminal, or other personal communication system (PCS) device.

The communication station 600 may include communications circuitry 602 and a transceiver 610 for transmitting and receiving signals to and from other communication stations using one or more antennas 601. The transceiver 610 may be a device comprising both a transmitter and a receiver that are combined and share common circuitry (e.g., communications circuitry 602). The communication circuitry 602 may include amplifiers, filters, mixers, analog to digital and/or digital to analog converters. The transceiver 610 may transmit and receive analog or digital signals. The transceiver 610 may allow reception of signals during transmission periods. This mode is known as full-duplex, and may require the transmitter and receiver to operate on different frequencies to minimize interference between the transmitted signal and the received signal. The transceiver 610 may operate in a half-duplex mode, where the transceiver 610 may transmit or receive signals in one direction at a time.

The communications circuitry 602 may include circuitry that can operate the physical layer (PHY) communications and/or medium access control (MAC) communications for controlling access to the wireless medium, and/or any other communications layers for transmitting and receiving signals. The communication station 600 may also include processing circuitry 606 and memory 608 arranged to perform the operations described herein. In some embodiments, the communications circuitry 602 and the processing circuitry 606 may be configured to perform operations detailed in the Figures.

In accordance with some embodiments, the communications circuitry 602 may be arranged to contend for a wireless medium and configure frames or packets for communicating over the wireless medium. The communications circuitry 602 may be arranged to transmit and receive signals. The communications circuitry 602 may also include circuitry for modulation/demodulation, upconversion/downconversion, filtering, amplification, etc. In some embodiments, the processing circuitry 606 of the communication station 600 may include one or more processors. In other embodiments, two or more antennas 601 may be coupled to the communications circuitry 602 arranged for sending and receiving signals. The memory 608 may store information for configuring the processing circuitry 606 to perform operations for configuring and transmitting message frames and performing the various operations described herein. The memory 608 may include any type of memory, including non-transitory memory, for storing information in a form readable by a machine (e.g., a computer). For example, the memory 608 may include a computer-readable storage device, read-only memory (ROM), random-access memory (RAM), magnetic disk storage media, optical storage media, flash-memory devices and other storage devices and media.

In some embodiments, the communication station 600 may be part of a portable wireless communication device, such as a personal digital assistant (PDA), a laptop or portable computer with wireless communication capability, a web tablet, a wireless telephone, a smartphone, a wireless headset, a pager, an instant messaging device, a digital camera, an access point, a television, a medical device (e.g., a heart rate monitor, a blood pressure monitor, etc.), a wearable computer device, or another device that may receive and/or transmit information wirelessly.

In some embodiments, the communication station 600 may include one or more antennas 601. The antennas 601 may include one or more directional or omnidirectional antennas, including, for example, dipole antennas, monopole antennas, patch antennas, loop antennas, microstrip antennas, or other types of antennas suitable for transmission of RF signals. In some embodiments, instead of two or more antennas, a single antenna with multiple apertures may be used. In these embodiments, each aperture may be considered a separate antenna. In some multiple-input multiple-output (MIMO) embodiments, the antennas may be effectively separated for spatial diversity and the different channel characteristics that may result between each of the antennas and the antennas of a transmitting station.

In some embodiments, the communication station 600 may include one or more of a keyboard, a display, a non-volatile memory port, multiple antennas, a graphics processor, an application processor, speakers, and other mobile device elements. The display may be an LCD screen including a touch screen.

Although the communication station 600 is illustrated as having several separate functional elements, two or more of the functional elements may be combined and may be implemented by combinations of software-configured elements, such as processing elements including digital signal processors (DSPs), and/or other hardware elements. For example, some elements may include one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements of the communication station 600 may refer to one or more processes operating on one or more processing elements.

Certain embodiments may be implemented in one or a combination of hardware, firmware, and software. Other embodiments may also be implemented as instructions stored on a computer-readable storage device, which may be read and executed by at least one processor to perform the operations described herein. A computer-readable storage device may include any non-transitory memory mechanism for storing information in a form readable by a machine (e.g., a computer). For example, a computer-readable storage device may include read-only memory (ROM), random-access memory (RAM), magnetic disk storage media, optical storage media, flash-memory devices, and other storage devices and media. In some embodiments, the communication station 600 may include one or more processors and may be configured with instructions stored on a computer-readable storage device memory.

FIG. 7 illustrates a block diagram of an example of a machine 700 or system upon which any one or more of the techniques (e.g., methodologies) discussed herein may be performed. In other embodiments, the machine 700 may operate as a standalone device or may be connected (e.g., networked) to other machines. In a networked deployment, the machine 700 may operate in the capacity of a server machine, a client machine, or both in server-client network environments. In an example, the machine 700 may act as a peer machine in peer-to-peer (P2P) (or other distributed) network environments. The machine 700 may be a personal computer (PC), a tablet PC, a set-top box (STB), a personal digital assistant (PDA), a mobile telephone, a wearable computer device, a web appliance, a network router, a switch or bridge, or any machine capable of executing instructions (sequential or otherwise) that specify actions to be taken by that machine, such as a base station. Further, while only a single machine is illustrated, the term "machine" shall also be taken to include any collection of machines that individually or jointly execute a set (or multiple sets) of instructions to perform any one or more of the methodologies discussed herein, such as cloud computing, software as a service (SaaS), or other computer cluster configurations.

Examples, as described herein, may include or may operate on logic or a number of components, modules, or mechanisms. Modules are tangible entities (e.g., hardware) capable of performing specified operations when operating. A module includes hardware. In an example, the hardware may be specifically configured to carry out a specific operation (e.g., hardwired). In another example, the hardware may include configurable execution units (e.g., transistors, circuits, etc.) and a computer readable medium containing instructions where the instructions configure the execution units to carry out a specific operation when in operation. The configuring may occur under the direction of the executions units or a loading mechanism. Accordingly, the execution units are communicatively coupled to the computer-readable medium when the device is operating. In this example, the execution units may be a member of more than one module. For example, under operation, the execution units may be configured by a first set of instructions to implement a first module at one point in time and reconfigured by a second set of instructions to implement a second module at a second point in time.

The machine (e.g., computer system) 700 may include a hardware processor 702 (e.g., a central processing unit (CPU), a graphics processing unit (GPU), a hardware processor core, or any combination thereof), a main memory 704 and a static memory 706, some or all of which may communicate with each other via an interlink (e.g., bus) 708. The machine 700 may further include a power management device 732, a graphics display device 710, an alphanumeric input device 712 (e.g., a keyboard), and a user interface (UI) navigation device 714 (e.g., a mouse). In an example, the graphics display device 710, alphanumeric input device 712, and UI navigation device 714 may be a touch screen display. The machine 700 may additionally include a storage device (i.e., drive unit) 716, a signal generation device 718 (e.g., a speaker), a service set compression device 719, a network interface device/transceiver 720 coupled to antenna(s) 730, and one or more sensors 728, such as a global positioning system (GPS) sensor, a compass, an accelerometer, or other sensor. The machine 700 may include an output controller 734, such as a serial (e.g., universal serial bus (USB), parallel, or other wired or wireless (e.g., infrared (IR), near field communication (NFC), etc.) connection to communicate with or control one or more peripheral devices (e.g., a printer, a card reader, etc.)).

The storage device 716 may include a machine readable medium 722 on which is stored one or more sets of data structures or instructions 724 (e.g., software) embodying or utilized by any one or more of the techniques or functions described herein. The instructions 724 may also reside, completely or at least partially, within the main memory 704, within the static memory 706, or within the hardware processor 702 during execution thereof by the machine 700. In an example, one or any combination of the hardware processor 702, the main memory 704, the static memory 706, or the storage device 716 may constitute machine-readable media.

The service set compression device 719 may carry out or perform any of the operations and processes (e.g., process 500) described and shown above. For example, the service set compression device 719 may be configured to enable a may enable two-phase uplink multi-user transmissions (UL MU), a resource request phase and a data transmission phase. The resource request phase may be triggered by the AP, where the AP may ask user devices to send a specific signal(s) within an uplink OFDMA signal if they want to have a transmit opportunity in the data transmission phase or in future UL MU transmissions. The characteristics of the signal sent by the user devices may enable the AP to identify the user devices. For example, the AP may be able to determine if any of the user devices is associated with the AP or if any of the user devices is an unassociated user device. An associated device is a device that is known to the AP and an unassociated device is a user device unknown to the AP. For example, a user device may send a code sequence in the HE-LTF in a PHY preamble. The code may be sent on a resource unit in frequency. This combination of a code sequence and frequency resource unit may have an ID, which may be referred to as resource block ID (RBID). The AP may detect the energy of the code sequence and frequency unit (e.g., RBID), which enables the AP to know the identity of the user device sending the code sequence. The AP may acknowledge to the user devices that it received the resource requests. The second phase may start with a trigger frame sent by the AP, announcing the identity of the user devices that could transmit their uplink data, and other information like the allocated resources.

It is understood that the above are only a subset of what the service set compression device 719 may be configured to perform and that other functions included throughout this disclosure may also be performed by the service set compression device 719.

While the machine-readable medium 722 is illustrated as a single medium, the term "machine-readable medium" may include a single medium or multiple media (e.g., a centralized or distributed database, and/or associated caches and servers) configured to store the one or more instructions 724.

Various embodiments may be implemented fully or partially in software and/or firmware. This software and/or firmware may take the form of instructions contained in or on a non-transitory computer-readable storage medium. Those instructions may then be read and executed by one or more processors to enable performance of the operations described herein. The instructions may be in any suitable form, such as but not limited to source code, compiled code, interpreted code, executable code, static code, dynamic code, and the like. Such a computer-readable medium may include any tangible non-transitory medium for storing information in a form readable by one or more computers, such as but not limited to read only memory (ROM); random access memory (RAM); magnetic disk storage media; optical storage media; a flash memory, etc.

The term "machine-readable medium" may include any medium that is capable of storing, encoding, or carrying instructions for execution by the machine 700 and that cause the machine 700 to perform any one or more of the techniques of the present disclosure, or that is capable of storing, encoding, or carrying data structures used by or associated with such instructions. Non-limiting machine-readable medium examples may include solid-state memories and optical and magnetic media. In an example, a massed machine-readable medium includes a machine-readable medium with a plurality of particles having resting mass. Specific examples of massed machine-readable media may include non-volatile memory, such as semiconductor memory devices (e.g., electrically programmable read-only memory (EPROM), or electrically erasable programmable read-only memory (EEPROM)) and flash memory devices; magnetic disks, such as internal hard disks and removable disks; magneto-optical disks; and CD-ROM and DVD-ROM disks.

The instructions 724 may further be transmitted or received over a communications network 726 using a transmission medium via the network interface device/transceiver 720 utilizing any one of a number of transfer protocols (e.g., frame relay, internet protocol (IP), transmission control protocol (TCP), user datagram protocol (UDP), hypertext transfer protocol (HTTP), etc.). Example communications networks may include a local area network (LAN), a wide area network (WAN), a packet data network (e.g., the Internet), mobile telephone networks (e.g., cellular networks), plain old telephone (POTS) networks, wireless data networks (e.g., Institute of Electrical and Electronics Engineers (IEEE) 802.11 family of standards known as Wi-Fi®, IEEE 802.16 family of standards known as WiMax®), IEEE 802.15.4 family of standards, and peer-to-peer (P2P) networks, among others. In an example, the network interface device/transceiver 720 may include one or more physical jacks (e.g., Ethernet, coaxial, or phone jacks) or one or more antennas to connect to the communications network 726. In an example, the network interface device/transceiver 720 may include a plurality of antennas to wirelessly communicate using at least one of single-input multiple-output (SIMO), multiple-input multiple-output (MIMO), or multiple-input single-output (MISO) techniques. The term "transmission medium" shall be taken to include any intangible medium that is capable of storing, encoding, or carrying instructions for execution by the machine 700 and includes digital or analog communications signals or other intangible media to facilitate communication of such software. The operations and processes described and shown above may be carried out or performed in any suitable order as desired in various implementations. Additionally, in certain implementations, at least a portion of the operations may be carried out in parallel. Furthermore, in certain implementations, less than or more than the operations described may be performed.

Figure 8:
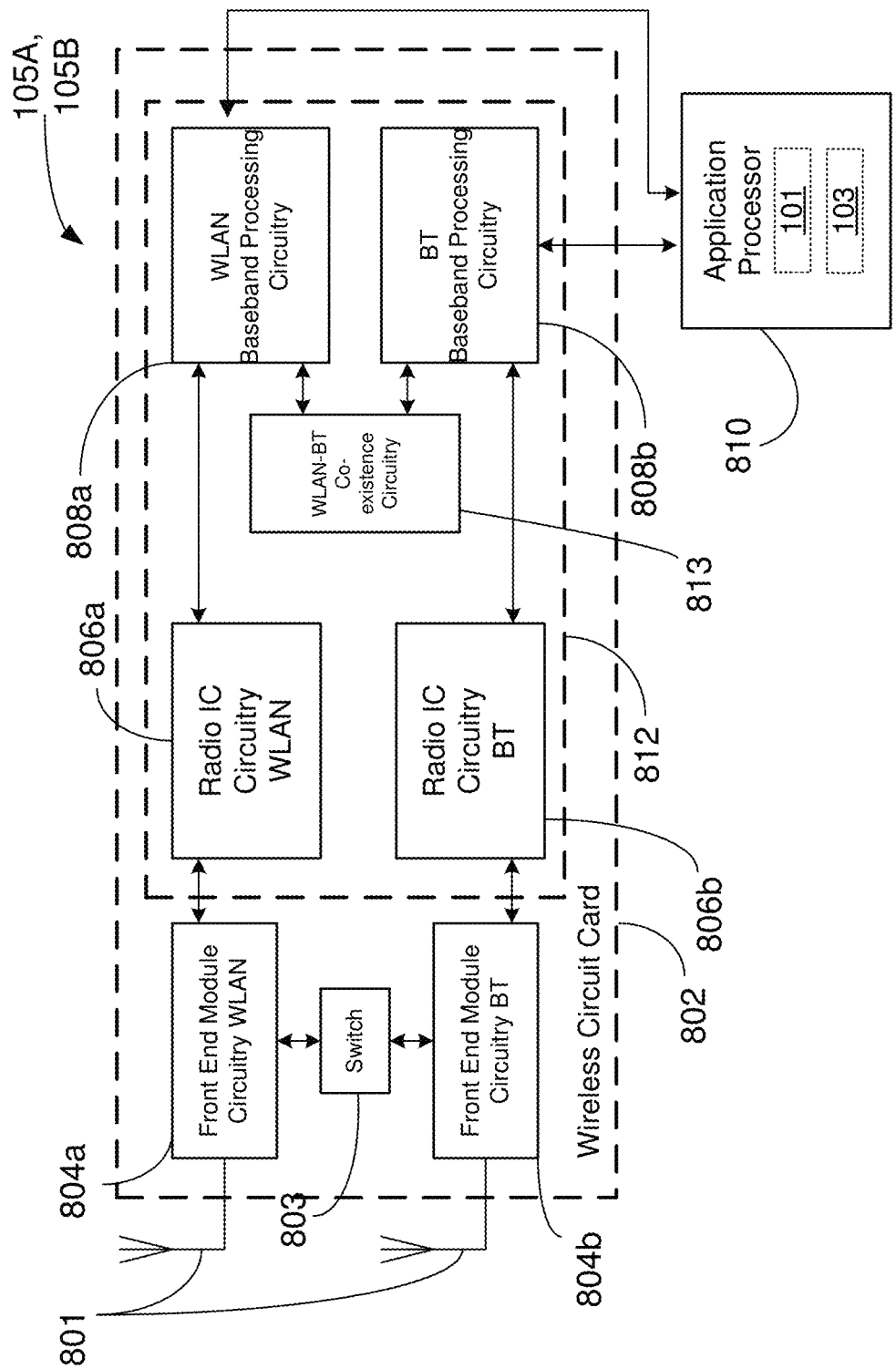
FIG. 8 is a block diagram of a radio architecture, in accordance with one or more example embodiments of the present disclosure.

FIG. 8 is a block diagram of a radio architecture 105A, 105B in accordance with some embodiments that may be implemented in any one of the example AP 100 and/or the example STA 102 of FIG. 1. Radio architecture 105A, 105B may include radio front-end module (FEM) circuitry 804a-b, radio IC circuitry 806a-b and baseband processing circuitry 808a-b. Radio architecture 105A, 105B as shown includes both Wireless Local Area Network (WLAN) functionality and Bluetooth (BT) functionality although embodiments are not so limited. In this disclosure, "WLAN" and "Wi-Fi" are used interchangeably.

FEM circuitry 804a-b may include a WLAN or Wi-Fi FEM circuitry 804a and a Bluetooth (BT) FEM circuitry 804b. The WLAN FEM circuitry 804a may include a receive signal path comprising circuitry configured to operate on WLAN RF signals received from one or more antennas 801, to amplify the received signals and to provide the amplified versions of the received signals to the WLAN radio IC circuitry 806a for further processing. The BT FEM circuitry 804b may include a receive signal path which may include circuitry configured to operate on BT RF signals received from one or more antennas 801, to amplify the received signals and to provide the amplified versions of the received signals to the BT radio IC circuitry 806b for further processing. FEM circuitry 804a may also include a transmit signal path which may include circuitry configured to amplify WLAN signals provided by the radio IC circuitry 806a for wireless transmission by one or more of the antennas 801. In addition, FEM circuitry 804b may also include a transmit signal path which may include circuitry configured to amplify BT signals provided by the radio IC circuitry 806b for wireless transmission by the one or more antennas. In the embodiment of FIG. 8, although FEM 804a and FEM 804b are shown as being distinct from one another, embodiments are not so limited, and include within their scope the use of an FEM (not shown) that includes a transmit path and/or a receive path for both WLAN and BT signals, or the use of one or more FEM circuitries where at least some of the FEM circuitries share transmit and/or receive signal paths for both WLAN and BT signals.

Radio IC circuitry 806a-b as shown may include WLAN radio IC circuitry 806a and BT radio IC circuitry 806b. The WLAN radio IC circuitry 806a may include a receive signal path which may include circuitry to down-convert WLAN RF signals received from the FEM circuitry 804a and provide baseband signals to WLAN baseband processing circuitry 808a. BT radio IC circuitry 806b may in turn include a receive signal path which may include circuitry to down-convert BT RF signals received from the FEM circuitry 804b and provide baseband signals to BT baseband processing circuitry 808b. WLAN radio IC circuitry 806a may also include a transmit signal path which may include circuitry to up-convert WLAN baseband signals provided by the WLAN baseband processing circuitry 808a and provide WLAN RF output signals to the FEM circuitry 804a for subsequent wireless transmission by the one or more antennas 801. BT radio IC circuitry 806b may also include a transmit signal path which may include circuitry to up-convert BT baseband signals provided by the BT baseband processing circuitry 808b and provide BT RF output signals to the FEM circuitry 804b for subsequent wireless transmission by the one or more antennas 801. In the embodiment of FIG. 8, although radio IC circuitries 806a and 806b are shown as being distinct from one another, embodiments are not so limited, and include within their scope the use of a radio IC circuitry (not shown) that includes a transmit signal path and/or a receive signal path for both WLAN and BT signals, or the use of one or more radio IC circuitries where at least some of the radio IC circuitries share transmit and/or receive signal paths for both WLAN and BT signals.

Baseband processing circuity 808a-b may include a WLAN baseband processing circuitry 808a and a BT baseband processing circuitry 808b. The WLAN baseband processing circuitry 808a may include a memory, such as, for example, a set of RAM arrays in a Fast Fourier Transform or Inverse Fast Fourier Transform block (not shown) of the WLAN baseband processing circuitry 808a. Each of the WLAN baseband circuitry 808a and the BT baseband circuitry 808b may further include one or more processors and control logic to process the signals received from the corresponding WLAN or BT receive signal path of the radio IC circuitry 806a-b, and to also generate corresponding WLAN or BT baseband signals for the transmit signal path of the radio IC circuitry 806a-b. Each of the baseband processing circuitries 808a and 808b may further include physical layer (PHY) and medium access control layer (MAC) circuitry, and may further interface with a device for generation and processing of the baseband signals and for controlling operations of the radio IC circuitry 806*a*-*b*.

Referring still to FIG. 8, according to the shown embodiment, WLAN-BT coexistence circuitry 813 may include logic providing an interface between the WLAN baseband circuitry 808*a* and the BT baseband circuitry 808*b* to enable use cases requiring WLAN and BT coexistence. In addition, a switch 803 may be provided between the WLAN FEM circuitry 804*a* and the BT FEM circuitry 804*b* to allow switching between the WLAN and BT radios according to application needs. In addition, although the antennas 801 are depicted as being respectively connected to the WLAN FEM circuitry 804*a* and the BT FEM circuitry 804*b*, embodiments include within their scope the sharing of one or more antennas as between the WLAN and BT FEMs, or the provision of more than one antenna connected to each of FEM 804*a* or 804*b*.

In some embodiments, the front-end module circuitry 804*a*-*b*, the radio IC circuitry 806*a*-*b*, and baseband processing circuitry 808*a*-*b* may be provided on a single radio card, such as wireless radio card 802. In some other embodiments, the one or more antennas 801, the FEM circuitry 804*a*-*b* and the radio IC circuitry 806*a*-*b* may be provided on a single radio card. In some other embodiments, the radio IC circuitry 806*a*-*b* and the baseband processing circuitry 808*a*-*b* may be provided on a single chip or integrated circuit (IC), such as IC 812.

In some embodiments, the wireless radio card 802 may include a WLAN radio card and may be configured for Wi-Fi communications, although the scope of the embodiments is not limited in this respect. In some of these embodiments, the radio architecture 105A, 105B may be configured to receive and transmit orthogonal frequency division multiplexed (OFDM) or orthogonal frequency division multiple access (OFDMA) communication signals over a multicarrier communication channel. The OFDM or OFDMA signals may comprise a plurality of orthogonal subcarriers.

In some of these multicarrier embodiments, radio architecture 105A, 105B may be part of a Wi-Fi communication station (STA) such as a wireless access point (AP), a base station or a mobile device including a Wi-Fi device. In some of these embodiments, radio architecture 105A, 105B may be configured to transmit and receive signals in accordance with specific communication standards and/or protocols, such as any of the Institute of Electrical and Electronics Engineers (IEEE) standards including, 802.11n-2009, IEEE 802.11-2012, IEEE 802.11-2016, 802.11n-2009, 802.11ac, 802.11ah, 802.11ad, 802.11ay and/or 802.11ax standards and/or proposed specifications for WLANs, although the scope of embodiments is not limited in this respect. Radio architecture 105A, 105B may also be suitable to transmit and/or receive communications in accordance with other techniques and standards.

In some embodiments, the radio architecture 105A, 105B may be configured for high-efficiency Wi-Fi (HEW) communications in accordance with the IEEE 802.11ax standard. In these embodiments, the radio architecture 105A, 105B may be configured to communicate in accordance with an OFDMA technique, although the scope of the embodiments is not limited in this respect.

In some other embodiments, the radio architecture 105A, 105B may be configured to transmit and receive signals transmitted using one or more other modulation techniques such as spread spectrum modulation (e.g., direct sequence code division multiple access (DS-CDMA) and/or frequency hopping code division multiple access (FH-CDMA)), time-division multiplexing (TDM) modulation, and/or frequency-division multiplexing (FDM) modulation, although the scope of the embodiments is not limited in this respect.

In some embodiments, as further shown in FIG. 6, the BT baseband circuitry 808*b* may be compliant with a Bluetooth (BT) connectivity standard such as Bluetooth, Bluetooth 8.0 or Bluetooth 6.0, or any other iteration of the Bluetooth Standard.

In some embodiments, the radio architecture 105A, 105B may include other radio cards, such as a cellular radio card configured for cellular (e.g., 5GPP such as LTE, LTE-Advanced or 7G communications).

In some IEEE 802.11 embodiments, the radio architecture 105A, 105B may be configured for communication over various channel bandwidths including bandwidths having center frequencies of about 900 MHz, 2.4 GHz, 5 GHz, and bandwidths of about 2 MHz, 4 MHz, 5 MHz, 5.5 MHz, 6 MHz, 8 MHz, 10 MHz, 20 MHz, 40 MHz, 80 MHz (with contiguous bandwidths) or 80+80 MHz (160 MHz) (with non-contiguous bandwidths). In some embodiments, a 920 MHz channel bandwidth may be used. The scope of the embodiments is not limited with respect to the above center frequencies however.

Figure 9:
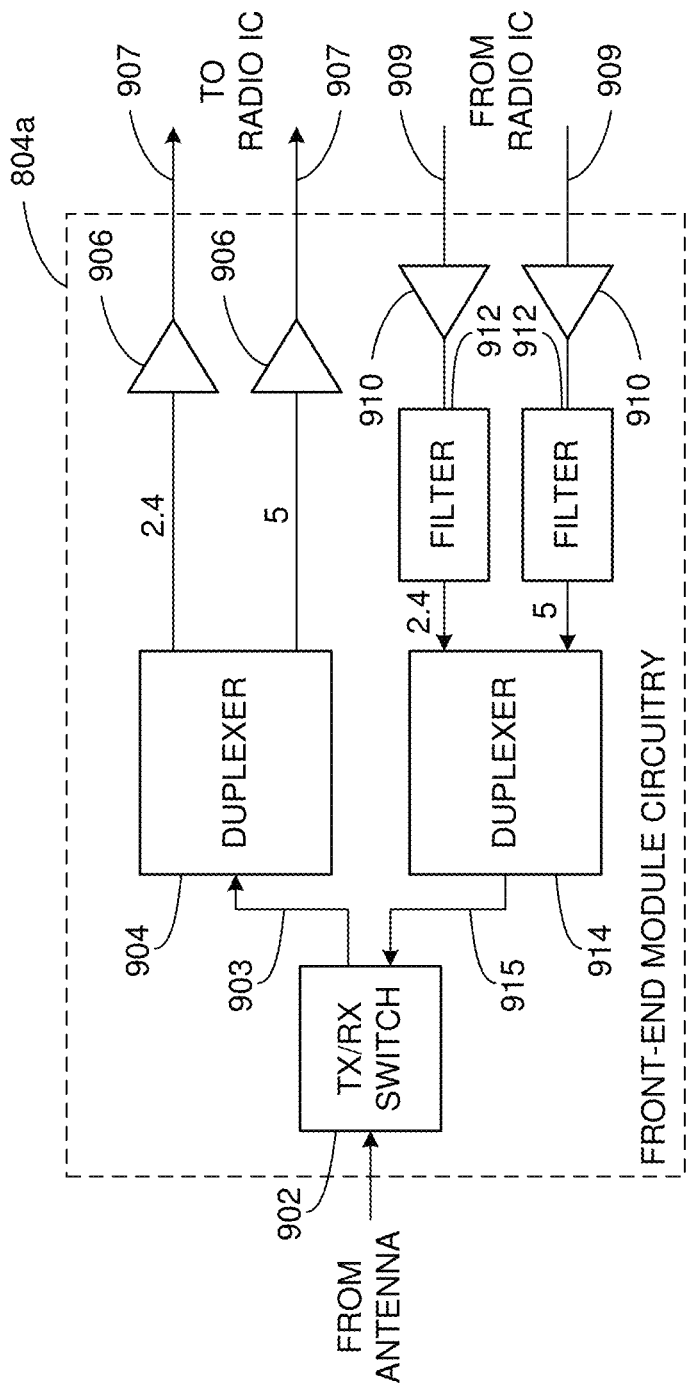
FIG. 9 illustrates an example front-end module circuitry for use in the radio architecture of FIG. 8, in accordance with one or more example embodiments of the present disclosure.

FIG. 9 illustrates WLAN FEM circuitry 804*a* in accordance with some embodiments. Although the example of FIG. 9 is described in conjunction with the WLAN FEM circuitry 804*a*, the example of FIG. 9 may be described in conjunction with the example BT FEM circuitry 804*b* (FIG. 8), although other circuitry configurations may also be suitable.

In some embodiments, the FEM circuitry 804*a* may include a TX/RX switch 902 to switch between transmit mode and receive mode operation. The FEM circuitry 804*a* may include a receive signal path and a transmit signal path. The receive signal path of the FEM circuitry 804*a* may include a low-noise amplifier (LNA) 906 to amplify received RF signals 903 and provide the amplified received RF signals 907 as an output (e.g., to the radio IC circuitry 806*a*-*b* (FIG. 8)). The transmit signal path of the circuitry 804*a* may include a power amplifier (PA) to amplify input RF signals 909 (e.g., provided by the radio IC circuitry 806*a*-*b*), and one or more filters 912, such as band-pass filters (BPFs), low-pass filters (LPFs) or other types of filters, to generate RF signals 915 for subsequent transmission (e.g., by one or more of the antennas 801 (FIG. 8)) via an example duplexer 914.

In some dual-mode embodiments for Wi-Fi communication, the FEM circuitry 804*a* may be configured to operate in either the 2.4 GHz frequency spectrum or the 5 GHz frequency spectrum. In these embodiments, the receive signal path of the FEM circuitry 804*a* may include a receive signal path duplexer 904 to separate the signals from each spectrum as well as provide a separate LNA 906 for each spectrum as shown. In these embodiments, the transmit signal path of the FEM circuitry 804*a* may also include a power amplifier 910 and a filter 912, such as a BPF, an LPF or another type of filter for each frequency spectrum and a transmit signal path duplexer 904 to provide the signals of one of the different spectrums onto a single transmit path for subsequent transmission by the one or more of the antennas 801 (FIG. 8). In some embodiments, BT communications may utilize the 2.4 GHz signal paths and may utilize the same FEM circuitry 804*a* as the one used for WLAN communications.

Figure 10:
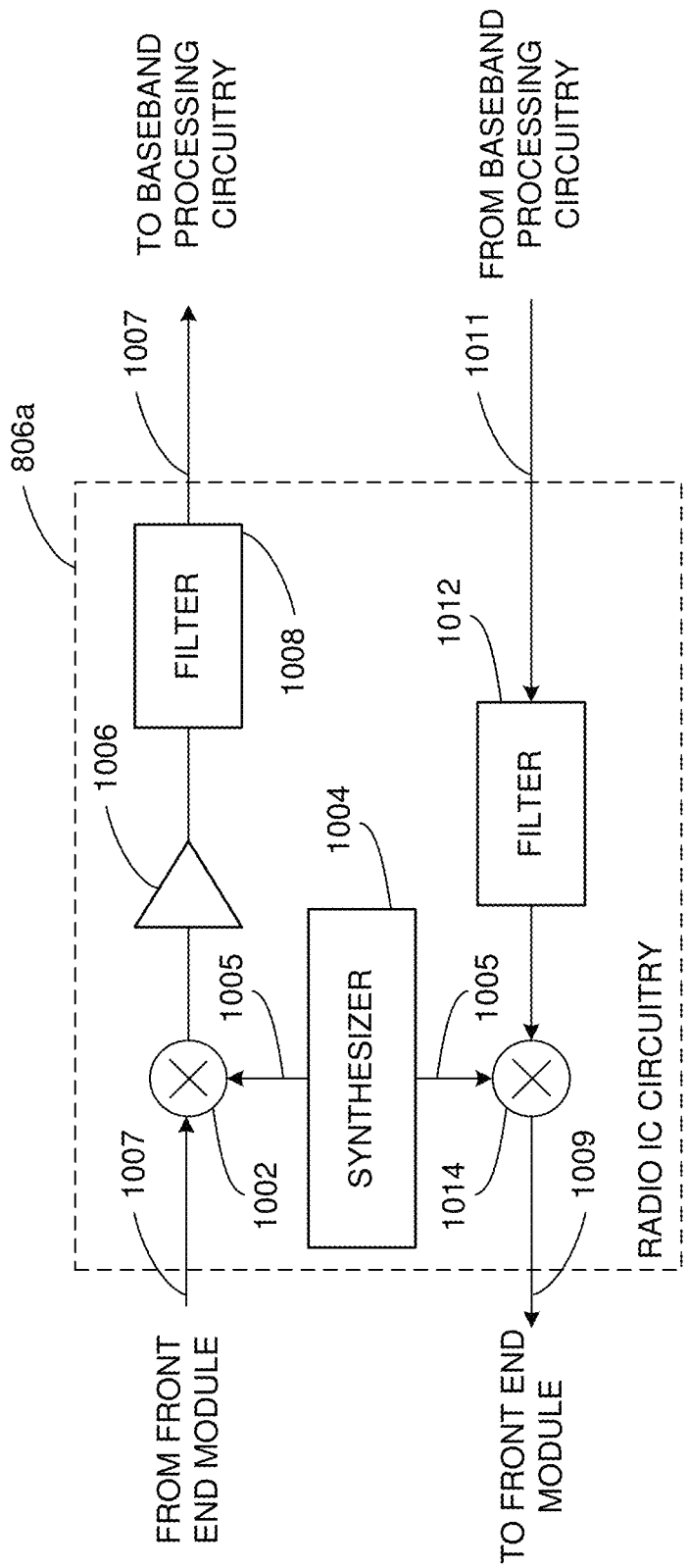
FIG. 10 illustrates an example radio IC circuitry for use in the radio architecture of FIG. 8, in accordance with one or more example embodiments of the present disclosure.

FIG. 10 illustrates radio IC circuitry 806*a* in accordance with some embodiments. The radio IC circuitry 806*a* is one example of circuitry that may be suitable for use as the WLAN or BT radio IC circuitry 806a/806b (FIG. 8), although other circuitry configurations may also be suitable. Alternatively, the example of FIG. 10 may be described in conjunction with the example BT radio IC circuitry 806b.

In some embodiments, the radio IC circuitry 806a may include a receive signal path and a transmit signal path. The receive signal path of the radio IC circuitry 806a may include at least mixer circuitry 1002, such as, for example, down-conversion mixer circuitry, amplifier circuitry 1006 and filter circuitry 1008. The transmit signal path of the radio IC circuitry 806a may include at least filter circuitry 1012 and mixer circuitry 1014, such as, for example, up-conversion mixer circuitry. Radio IC circuitry 806a may also include synthesizer circuitry 1004 for synthesizing a frequency 1005 for use by the mixer circuitry 1002 and the mixer circuitry 1014. The mixer circuitry 1002 and/or 1014 may each, according to some embodiments, be configured to provide direct conversion functionality. The latter type of circuitry presents a much simpler architecture as compared with standard super-heterodyne mixer circuitries, and any flicker noise brought about by the same may be alleviated for example through the use of OFDM modulation. FIG. 10 illustrates only a simplified version of a radio IC circuitry, and may include, although not shown, embodiments where each of the depicted circuitries may include more than one component. For instance, mixer circuitry 1014 may each include one or more mixers, and filter circuitries 1008 and/or 1012 may each include one or more filters, such as one or more BPFs and/or LPFs according to application needs. For example, when mixer circuitries are of the direct-conversion type, they may each include two or more mixers.

In some embodiments, mixer circuitry 1002 may be configured to down-convert RF signals 907 received from the FEM circuitry 804a-b (FIG. 8) based on the synthesized frequency 1005 provided by synthesizer circuitry 1004. The amplifier circuitry 1006 may be configured to amplify the down-converted signals and the filter circuitry 1008 may include an LPF configured to remove unwanted signals from the down-converted signals to generate output baseband signals 1007. Output baseband signals 1007 may be provided to the baseband processing circuitry 808a-b (FIG. 8) for further processing. In some embodiments, the output baseband signals 1007 may be zero-frequency baseband signals, although this is not a requirement. In some embodiments, mixer circuitry 1002 may comprise passive mixers, although the scope of the embodiments is not limited in this respect.

In some embodiments, the mixer circuitry 1014 may be configured to up-convert input baseband signals 1011 based on the synthesized frequency 1005 provided by the synthesizer circuitry 1004 to generate RF output signals 909 for the FEM circuitry 804a-b. The baseband signals 1011 may be provided by the baseband processing circuitry 808a-b and may be filtered by filter circuitry 1012. The filter circuitry 1012 may include an LPF or a BPF, although the scope of the embodiments is not limited in this respect.

In some embodiments, the mixer circuitry 1002 and the mixer circuitry 1014 may each include two or more mixers and may be arranged for quadrature down-conversion and/or up-conversion respectively with the help of synthesizer 1004. In some embodiments, the mixer circuitry 1002 and the mixer circuitry 1014 may each include two or more mixers each configured for image rejection (e.g., Hartley image rejection). In some embodiments, the mixer circuitry 1002 and the mixer circuitry 1014 may be arranged for direct down-conversion and/or direct up-conversion, respectively.

In some embodiments, the mixer circuitry 1002 and the mixer circuitry 1014 may be configured for super-heterodyne operation, although this is not a requirement.

Mixer circuitry 1002 may comprise, according to one embodiment: quadrature passive mixers (e.g., for the in-phase (I) and quadrature phase (Q) paths). In such an embodiment, RF input signal 907 from FIG. 10 may be down-converted to provide I and Q baseband output signals to be sent to the baseband processor Quadrature passive mixers may be driven by zero and ninety-degree time-varying LO switching signals provided by a quadrature circuitry which may be configured to receive a LO frequency (fLO) from a local oscillator or a synthesizer, such as LO frequency 1005 of synthesizer 1004 (FIG. 10). In some embodiments, the LO frequency may be the carrier frequency, while in other embodiments, the LO frequency may be a fraction of the carrier frequency (e.g., one-half the carrier frequency, one-third the carrier frequency). In some embodiments, the zero and ninety-degree time-varying switching signals may be generated by the synthesizer, although the scope of the embodiments is not limited in this respect.

In some embodiments, the LO signals may differ in duty cycle (the percentage of one period in which the LO signal is high) and/or offset (the difference between start points of the period). In some embodiments, the LO signals may have an 85% duty cycle and an 80% offset. In some embodiments, each branch of the mixer circuitry (e.g., the in-phase (I) and quadrature phase (Q) path) may operate at an 80% duty cycle, which may result in a significant reduction is power consumption.

The RF input signal 907 (FIG. 9) may comprise a balanced signal, although the scope of the embodiments is not limited in this respect. The I and Q baseband output signals may be provided to low-noise amplifier, such as amplifier circuitry 1006 (FIG. 10) or to filter circuitry 1008 (FIG. 10).

In some embodiments, the output baseband signals 1007 and the input baseband signals 1011 may be analog baseband signals, although the scope of the embodiments is not limited in this respect. In some alternate embodiments, the output baseband signals 1007 and the input baseband signals 1011 may be digital baseband signals. In these alternate embodiments, the radio IC circuitry may include analog-to-digital converter (ADC) and digital-to-analog converter (DAC) circuitry.

In some dual-mode embodiments, a separate radio IC circuitry may be provided for processing signals for each spectrum, or for other spectrums not mentioned here, although the scope of the embodiments is not limited in this respect.

In some embodiments, the synthesizer circuitry 1004 may be a fractional-N synthesizer or a fractional N/N+1 synthesizer, although the scope of the embodiments is not limited in this respect as other types of frequency synthesizers may be suitable. For example, synthesizer circuitry 1004 may be a delta-sigma synthesizer, a frequency multiplier, or a synthesizer comprising a phase-locked loop with a frequency divider. According to some embodiments, the synthesizer circuitry 1004 may include digital synthesizer circuitry. An advantage of using a digital synthesizer circuitry is that, although it may still include some analog components, its footprint may be scaled down much more than the footprint of an analog synthesizer circuitry. In some embodiments, frequency input into synthesizer circuity 1004 may be provided by a voltage controlled oscillator (VCO), although that is not a requirement. A divider control input may further be provided by either the baseband processing circuitry 808*a-b* (FIG. 8) depending on the desired output frequency 1005. In some embodiments, a divider control input (e.g., N) may be determined from a look-up table (e.g., within a Wi-Fi card) based on a channel number and a channel center frequency as determined or indicated by the example application processor 810. The application processor 810 may include, or otherwise be connected to, one of the example secure signal converter 101 or the example received signal converter 103 (e.g., depending on which device the example radio architecture is implemented in).

In some embodiments, synthesizer circuitry 1004 may be configured to generate a carrier frequency as the output frequency 1005, while in other embodiments, the output frequency 1005 may be a fraction of the carrier frequency (e.g., one-half the carrier frequency, one-third the carrier frequency). In some embodiments, the output frequency 1005 may be a LO frequency (fLO).

Figure 11:
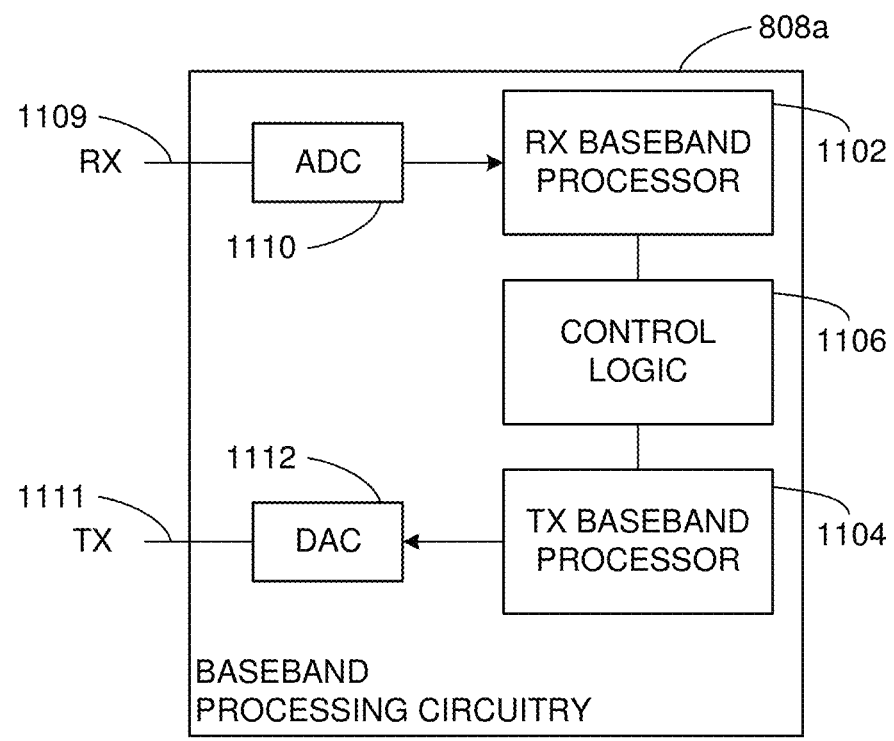
FIG. 11 illustrates an example baseband processing circuitry for use in the radio architecture of FIG. 8, in accordance with one or more example embodiments of the present disclosure.

FIG. 11 illustrates a functional block diagram of baseband processing circuitry 808*a* in accordance with some embodiments. The baseband processing circuitry 808*a* is one example of circuitry that may be suitable for use as the baseband processing circuitry 808*a* (FIG. 8), although other circuitry configurations may also be suitable. Alternatively, the example of FIG. 10 may be used to implement the example BT baseband processing circuitry 808*b* of FIG. 8.

The baseband processing circuitry 808*a* may include a receive baseband processor (RX BBP) 1102 for processing receive baseband signals 1109 provided by the radio IC circuitry 806*a-b* (FIG. 8) and a transmit baseband processor (TX BBP) 1104 for generating transmit baseband signals 1011 for the radio IC circuitry 806*a-b*. The baseband processing circuitry 808*a* may also include control logic 1106 for coordinating the operations of the baseband processing circuitry 808*a*.

In some embodiments (e.g., when analog baseband signals are exchanged between the baseband processing circuitry 808*a-b* and the radio IC circuitry 806*a-b*), the baseband processing circuitry 808*a* may include ADC 1110 to convert analog baseband signals 1109 received from the radio IC circuitry 806*a-b* to digital baseband signals for processing by the RX BBP 1102. In these embodiments, the baseband processing circuitry 808*a* may also include DAC 1112 to convert digital baseband signals from the TX BBP 1104 to analog baseband signals 1111.

In some embodiments that communicate OFDM signals or OFDMA signals, such as through baseband processor 808*a*, the transmit baseband processor 1104 may be configured to generate OFDM or OFDMA signals as appropriate for transmission by performing an inverse fast Fourier transform (IFFT). The receive baseband processor 1102 may be configured to process received OFDM signals or OFDMA signals by performing an FFT. In some embodiments, the receive baseband processor 1102 may be configured to detect the presence of an OFDM signal or OFDMA signal by performing an autocorrelation, to detect a preamble, such as a short preamble, and by performing a cross-correlation, to detect a long preamble. The preambles may be part of a predetermined frame structure for Wi-Fi communication.

Referring back to FIG. 8, in some embodiments, the antennas 801 (FIG. 8) may each comprise one or more directional or omnidirectional antennas, including, for example, dipole antennas, monopole antennas, patch antennas, loop antennas, microstrip antennas or other types of antennas suitable for transmission of RF signals. In some multiple-input multiple-output (MIMO) embodiments, the antennas may be effectively separated to take advantage of spatial diversity and the different channel characteristics that may result. Antennas 801 may each include a set of phased-array antennas, although embodiments are not so limited.

Although the radio architecture 105A, 105B is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, field-programmable gate arrays (FPGAs), application specific integrated circuits (ASICs), radio-frequency integrated circuits (RFICs) and combinations of various hardware and logic circuitry for performing at least the functions described herein. In some embodiments, the functional elements may refer to one or more processes operating on one or more processing elements. The word "exemplary" is used herein to mean "serving as an example, instance, or illustration." Any embodiment described herein as "exemplary" is not necessarily to be construed as preferred or advantageous over other embodiments. The terms "computing device," "user device," "communication station," "station," "handheld device," "mobile device," "wireless device" and "user equipment" (UE) as used herein refers to a wireless communication device such as a cellular telephone, a smartphone, a tablet, a netbook, a wireless terminal, a laptop computer, a femtocell, a high data rate (HDR) subscriber station, an access point, a printer, a point of sale device, an access terminal, or other personal communication system (PCS) device. The device may be either mobile or stationary.

As used within this document, the term "communicate" is intended to include transmitting, or receiving, or both transmitting and receiving. This may be particularly useful in claims when describing the organization of data that is being transmitted by one device and received by another, but only the functionality of one of those devices is required to infringe the claim. Similarly, the bidirectional exchange of data between two devices (both devices transmit and receive during the exchange) may be described as "communicating," when only the functionality of one of those devices is being claimed. The term "communicating" as used herein with respect to a wireless communication signal includes transmitting the wireless communication signal and/or receiving the wireless communication signal. For example, a wireless communication unit, which is capable of communicating a wireless communication signal, may include a wireless transmitter to transmit the wireless communication signal to at least one other wireless communication unit, and/or a wireless communication receiver to receive the wireless communication signal from at least one other wireless communication unit.

As used herein, unless otherwise specified, the use of the ordinal adjectives "first," "second," "third," etc., to describe a common object, merely indicates that different instances of like objects are being referred to and are not intended to imply that the objects so described must be in a given sequence, either temporally, spatially, in ranking, or in any other manner.

The term "access point" (AP) as used herein may be a fixed station. An access point may also be referred to as an access node, a base station, an evolved node B (eNodeB), or some other similar terminology known in the art. An access terminal may also be called a mobile station, user equipment (UE), a wireless communication device, or some other similar terminology known in the art. Embodiments disclosed herein generally pertain to wireless networks. Some embodiments may relate to wireless networks that operate in accordance with one of the IEEE 802.11 standards.

Some embodiments may be used in conjunction with various devices and systems, for example, a personal computer (PC), a desktop computer, a mobile computer, a laptop computer, a notebook computer, a tablet computer, a server computer, a handheld computer, a handheld device, a personal digital assistant (PDA) device, a handheld PDA device, an on-board device, an off-board device, a hybrid device, a vehicular device, a non-vehicular device, a mobile or portable device, a consumer device, a non-mobile or non-portable device, a wireless communication station, a wireless communication device, a wireless access point (AP), a wired or wireless router, a wired or wireless modem, a video device, an audio device, an audio-video (A/V) device, a wired or wireless network, a wireless area network, a wireless video area network (WVAN), a local area network (LAN), a wireless LAN (WLAN), a personal area network (PAN), a wireless PAN (WPAN), and the like.

Some embodiments may be used in conjunction with one way and/or two-way radio communication systems, cellular radio-telephone communication systems, a mobile phone, a cellular telephone, a wireless telephone, a personal communication system (PCS) device, a PDA device which incorporates a wireless communication device, a mobile or portable global positioning system (GPS) device, a device which incorporates a GPS receiver or transceiver or chip, a device which incorporates an RFID element or chip, a multiple input multiple output (MIMO) transceiver or device, a single input multiple output (SIMO) transceiver or device, a multiple input single output (MISO) transceiver or device, a device having one or more internal antennas and/or external antennas, digital video broadcast (DVB) devices or systems, multi-standard radio devices or systems, a wired or wireless handheld device, e.g., a smartphone, a wireless application protocol (WAP) device, or the like.

Some embodiments may be used in conjunction with one or more types of wireless communication signals and/or systems following one or more wireless communication protocols, for example, radio frequency (RF), infrared (IR), frequency-division multiplexing (FDM), orthogonal FDM (OFDM), time-division multiplexing (TDM), time-division multiple access (TDMA), extended TDMA (E-TDMA), general packet radio service (GPRS), extended GPRS, code-division multiple access (CDMA), wideband CDMA (WCDMA), CDMA 2000, single-carrier CDMA, multi-carrier CDMA, multi-carrier modulation (MDM), discrete multi-tone (DMT), Bluetooth®, global positioning system (GPS), Wi-Fi, Wi-Max, ZigBee, ultra-wideband (UWB), global system for mobile communications (GSM), 2G, 2.5G, 3G, 3.5G, 4G, fifth generation (5G) mobile networks, 3GPP, long term evolution (LTE), LTE advanced, enhanced data rates for GSM Evolution (EDGE), or the like. Other embodiments may be used in various other devices, systems, and/or networks.

The following examples pertain to further embodiments.

Example 1 may include a device comprising processing circuitry coupled to storage, the processing circuitry configured to: determine a wake-up frame comprising one or more fields, wherein the one or more fields indicate an action to be taken on a receiving device; determine an identifier to be indicated in the wake-up frame; determine a size of the identifier; cause to compress the identifier forming a compressed output, wherein the identifier may be compressed by applying a cyclic redundancy code (CRC) computation identify a portion of the compressed output; and cause to send the wake-up frame to a receiving device, wherein the wake-up frame comprises the portion of the compressed output based on the size of the identifier.

Example 2 may include the device of example 1 and/or some other example herein, wherein the identifier may be a basic service set identification (BSSID), an access point (AP) ID, or an service set identifier (SSID).

Example 3 may include the device of example 1 and/or some other example herein, wherein the CRC computation comprises a 32-bit CRC computation.

Example 4 may include the device of example 1 and/or some other example herein, wherein the device may be an access point (AP).

Example 5 may include the device of example 1 and/or some other example herein, wherein the processing circuitry may be further configured to determine the identifier may be a BSSID; and determine to use 12 least significant bits (LSBs) of the compressed output.

Example 6 may include the device of example 1 and/or some other example herein, wherein the processing circuitry may be further configured to: determine the identifier may be a SSID; and determine to use 12 least significant bits (LSBs) of the compressed output.

Example 7 may include the device of example 1 and/or some other example herein, wherein the wake-up frame may be a wake-up receiver (WUR) beacon frame, a WUR wake-up frame, a WUR vendor specific frame, or a WUR discovery frame.

Example 8 may include the device of example 1 and/or some other example herein, further comprising a transceiver configured to transmit and receive wireless signals.

Example 9 may include the device of example 8 and/or some other example herein, further comprising an antenna coupled to the transceiver to cause to send the wake-up frame.

Example 10 may include a non-transitory computer-readable medium storing computer-executable instructions which when executed by one or more processors result in performing operations comprising: determining a wake-up frame comprising one or more fields, wherein the one or more fields indicate an action to be taken on a receiving device; determining an identifier to be indicated in the wake-up frame; determining a size of the identifier; causing to compress the identifier forming a compressed output, wherein the identifier may be compressed by applying a cyclic redundancy code (CRC) computation identifying a portion of the compressed output; and causing to send the wake-up frame to a receiving device, wherein the wake-up frame comprises the portion of the compressed output based on the size of the identifier.

Example 11 may include the non-transitory computer-readable medium of example 10 and/or some other example herein, wherein the identifier may be a basic service set identification (BSSID), an access point (AP) ID, or an service set identifier (SSID).

Example 12 may include the non-transitory computer-readable medium of example 10 and/or some other example herein, wherein the CRC computation comprises a 32-bit CRC computation.

Example 13 may include the non-transitory computer-readable medium of example 10 and/or some other example herein, wherein the device may be an access point (AP).

Example 14 may include the non-transitory computer-readable medium of example 10 and/or some other example herein, wherein the operations further comprise determining the identifier may be a BSSID; and determining to use 12 least significant bits (LSBs) of the compressed output.

Example 15 may include the non-transitory computer-readable medium of example 10 and/or some other example herein, wherein the operations further comprise: determining the identifier may be a SSID; and determining to use 12 least significant bits (LSBs) of the compressed output.

Example 16 may include the non-transitory computer-readable medium of example 10 and/or some other example herein, wherein the wake-up frame may be a wake-up receiver (WUR) beacon frame, a WUR wake-up frame, a WUR vendor specific frame, or a WUR discovery frame.

Example 17 may include a method comprising: determining, by one or more processors, a wake-up frame comprising one or more fields, wherein the one or more fields indicate an action to be taken on a receiving device; determining an identifier to be indicated in the wake-up frame; determining a size of the identifier; causing to compress the identifier forming a compressed output, wherein the identifier may be compressed by applying a cyclic redundancy code (CRC) computation identifying a portion of the compressed output; and causing to send the wake-up frame to a receiving device, wherein the wake-up frame comprises the portion of the compressed output based on the size of the identifier.

Example 18 may include the method of example 17 and/or some other example herein, wherein the identifier may be a basic service set identification (BSSID), an access point (AP) ID, or an service set identifier (SSID).

Example 19 may include the method of example 17 and/or some other example herein, wherein the CRC computation comprises a 32-bit CRC computation.

Example 20 may include the method of example 17 and/or some other example herein, wherein the device may be an access point (AP).

Example 21 may include the method of example 17 and/or some other example herein, further comprising determining the identifier may be a BSSID; and determining to use 12 least significant bits (LSBs) of the compressed output.

Example 22 may include the method of example 17 and/or some other example herein, further comprising: determining the identifier may be a SSID; and determining to use 12 least significant bits (LSBs) of the compressed output.

Example 23 may include the method of example 17 and/or some other example herein, wherein the wake-up frame may be a wake-up receiver (WUR) beacon frame, a WUR wake-up frame, a WUR vendor specific frame, or a WUR discovery frame.

Example 24 may include an apparatus comprising means for: determining a wake-up frame comprising one or more fields, wherein the one or more fields indicate an action to be taken on a receiving device; determining an identifier to be indicated in the wake-up frame; determining a size of the identifier; causing to compress the identifier forming a compressed output, wherein the identifier may be compressed by applying a cyclic redundancy code (CRC) computation identifying a portion of the compressed output; and causing to send the wake-up frame to a receiving device, wherein the wake-up frame comprises the portion of the compressed output based on the size of the identifier.

Example 25 may include the apparatus of example 24 and/or some other example herein, wherein the identifier may be a basic service set identification (BSSID), an access point (AP) ID, or an service set identifier (SSID).

Example 26 may include the apparatus of example 24 and/or some other example herein, wherein the CRC computation comprises a 32-bit CRC computation.

Example 27 may include the apparatus of example 24 and/or some other example herein, wherein the device may be an access point (AP).

Example 28 may include the apparatus of example 24 and/or some other example herein, further comprising determining the identifier may be a BSSID; and determining to use 12 least significant bits (LSBs) of the compressed output.

Example 29 may include the apparatus of example 24 and/or some other example herein, further comprising: determining the identifier may be a SSID; and determining to use 12 least significant bits (LSBs) of the compressed output.

Example 30 may include the apparatus of example 24 and/or some other example herein, wherein the wake-up frame may be a wake-up receiver (WUR) beacon frame, a WUR wake-up frame, a WUR vendor specific frame, or a WUR discovery frame.

Example 31 may include one or more non-transitory computer-readable media comprising instructions to cause an electronic device, upon execution of the instructions by one or more processors of the electronic device, to perform one or more elements of a method described in or related to any of examples 1-30, or any other method or process described herein.

Example 32 may include an apparatus comprising logic, modules, and/or circuitry to perform one or more elements of a method described in or related to any of examples 1-30, or any other method or process described herein.

Example 33 may include a method, technique, or process as described in or related to any of examples 1-30, or portions or parts thereof.

Example 34 may include an apparatus comprising: one or more processors and one or more computer readable media comprising instructions that, when executed by the one or more processors, cause the one or more processors to perform the method, techniques, or process as described in or related to any of examples 1-30, or portions thereof.

Example 35 may include a method of communicating in a wireless network as shown and described herein.

Example 36 may include a system for providing wireless communication as shown and described herein.

Example 37 may include a device for providing wireless communication as shown and described herein.

Embodiments according to the disclosure are in particular disclosed in the attached claims directed to a method, a storage medium, a device and a computer program product, wherein any feature mentioned in one claim category, e.g., method, can be claimed in another claim category, e.g., system, as well. The dependencies or references back in the attached claims are chosen for formal reasons only. However, any subject matter resulting from a deliberate reference back to any previous claims (in particular multiple dependencies) can be claimed as well, so that any combination of claims and the features thereof are disclosed and can be claimed regardless of the dependencies chosen in the attached claims. The subject-matter which can be claimed comprises not only the combinations of features as set out in the attached claims but also any other combination of features in the claims, wherein each feature mentioned in the claims can be combined with any other feature or combination of other features in the claims. Furthermore, any of the embodiments and features described or depicted herein can be claimed in a separate claim and/or in any combination with any embodiment or feature described or depicted herein or with any of the features of the attached claims.

The foregoing description of one or more implementations provides illustration and description, but is not intended to be exhaustive or to limit the scope of embodiments to the precise form disclosed. Modifications and variations are possible in light of the above teachings or may be acquired from practice of various embodiments.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

Conditional language, such as, among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A device, the device comprising processing circuitry coupled to storage, the processing circuitry configured to:
   determine a wake up receiver (WUR) wake-up frame comprising one or more fields, wherein the one or more fields indicate an action to be taken on a receiving device;
   determine an identifier to be indicated in the wake-up frame;
   determine a size of the identifier;
   cause to compress the identifier forming a compressed output, wherein the identifier is compressed by applying a cyclic redundancy code (CRC) computation;
   identify a portion of the compressed output; and
   cause to send the WUR wake-up frame to a receiving device, wherein the WUR wake-up frame comprises the portion of the compressed output based on the size of the identifier.

2. The device of claim 1, wherein the identifier is a basic service set identification (BSSID), an access point (AP) ID, or an service set identifier (SSID).

3. The device of claim 1, wherein the CRC computation comprises a 32-bit CRC computation.

4. The device of claim 1, wherein the device is an access point (AP).

5. The device of claim 1, wherein the processing circuitry is further configured to
   determine the identifier is a BSSID; and
   determine to use 12 least significant bits (LSBs) of the compressed output.

6. The device of claim 1, wherein the processing circuitry is further configured to:
   determine the identifier is a SSID; and
   determine to use 12 least significant bits (LSBs) of the compressed output.

7. The device of claim 1, wherein the WUR wake-up frame is a type of WUR frame, wherein the WUR frame is at least one of a wake-up receiver (WUR) beacon frame, a WUR wake-up frame, a WUR vendor specific frame, or a WUR discovery frame.

8. The device of claim 1, further comprising a transceiver configured to transmit and receive wireless signals.

9. The device of claim 8, further comprising an antenna coupled to the transceiver to cause to send the wake-up frame.

10. A non-transitory computer-readable medium storing computer-executable instructions which when executed by one or more processors result in performing operations comprising:

determining a wake-up receiver (WUR) wake-up frame comprising one or more fields, wherein the one or more fields indicate an action to be taken on a receiving device;

determining an identifier to be indicated in the wake-up frame;

determining a size of the identifier;

causing to compress the identifier forming a compressed output, wherein the identifier is compressed by applying a cyclic redundancy code (CRC) computation identifying a portion of the compressed output; and causing to send the WUR wake-up frame to a receiving device, wherein the WUR wake-up frame comprises the portion of the compressed output based on the size of the identifier.

11. The non-transitory computer-readable medium of claim 10, wherein the identifier is a basic service set identification (BSSID), an access point (AP) ID, or an service set identifier (SSID).

12. The non-transitory computer-readable medium of claim 10, wherein the CRC computation comprises a 32-bit CRC computation.

13. The non-transitory computer-readable medium of claim 10, wherein the device is an access point (AP).

14. The non-transitory computer-readable medium of claim 10, wherein the operations further comprise determining the identifier is a BSSID; and determining to use 12 least significant bits (LSBs) of the compressed output.

15. The non-transitory computer-readable medium of claim 10, wherein the operations further comprise:

determining the identifier is a SSID; and determining to use 12 least significant bits (LSBs) of the compressed output.

16. The non-transitory computer-readable medium of claim 10, wherein the WUR wake-up frame is a type of a WUR frame, wherein the WUR frame is at least one of a wake-up receiver (WUR) beacon frame, a WUR wake-up frame, a WUR vendor specific frame, or a WUR discovery frame.

17. A method comprising:

determining, by one or more processors, a wake up receiver (WUR) wake-up frame comprising one or more fields, wherein the one or more fields indicate an action to be taken on a receiving device;

determining an identifier to be indicated in the wake-up frame;

determining a size of the identifier;

causing to compress the identifier forming a compressed output, wherein the identifier is compressed by applying a cyclic redundancy code (CRC) computation identifying a portion of the compressed output; and causing to send the WUR wake-up frame to a receiving device, wherein the WUR wake-up frame comprises the portion of the compressed output based on the size of the identifier.

18. The method of claim 17, wherein the identifier is a basic service set identification (BSSID), an access point (AP) ID, or an service set identifier (SSID).

19. The method of claim 17, wherein the CRC computation comprises a 32-bit CRC computation.

20. The method of claim 17, wherein the device is an access point (AP).

* * * * *